(12) United States Patent
Suzuki

(10) Patent No.: US 10,239,553 B2
(45) Date of Patent: Mar. 26, 2019

(54) POWER CONVERTER

(71) Applicant: DENSO CORPORATION, Kariya, Aichi-pref. (JP)

(72) Inventor: Takashi Suzuki, Kariya (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 0 days.

(21) Appl. No.: 15/210,743

(22) Filed: Jul. 14, 2016

(65) Prior Publication Data

US 2017/0019052 A1  Jan. 19, 2017

(30) Foreign Application Priority Data

Jul. 16, 2015  (JP) .................................. 2015-141982

(51) Int. Cl.
| | |
|---|---|
| B62D 5/04 | (2006.01) |
| H02M 7/5387 | (2007.01) |
| H02M 1/00 | (2006.01) |
| H02M 1/32 | (2007.01) |

(52) U.S. Cl.
CPC .......... *B62D 5/04* (2013.01); *H02M 7/53875* (2013.01); *H02M 1/32* (2013.01); *H02M 2001/0009* (2013.01)

(58) Field of Classification Search
USPC ............. 318/139, 400.17, 400.2, 40.26, 801, 318/568.22, 632, 400.3
See application file for complete search history.

(56) References Cited

U.S. PATENT DOCUMENTS

| | | | | |
|---|---|---|---|---|
| 2011/0221375 A1* | 9/2011 | Suzuki | ................... | B62D 5/046 318/496 |
| 2013/0264974 A1 | 10/2013 | Suzuki | | |
| 2013/0285591 A1* | 10/2013 | Suzuki | ................... | H02P 25/22 318/724 |
| 2014/0009093 A1* | 1/2014 | Suzuki | ................ | H02P 21/0096 318/400.02 |

(Continued)

FOREIGN PATENT DOCUMENTS

| | | |
|---|---|---|
| JP | 2008-048504 A | 2/2008 |
| JP | 2014-121189 A | 6/2014 |
| WO | 2014/125568 A1 | 12/2015 |

*Primary Examiner* — Jorge L Carrasquillo
(74) *Attorney, Agent, or Firm* — Knobbe, Martens, Olson & Bear LLP

(57) ABSTRACT

A power converter for a three-phase electric rotary machine including first and second winding sets includes: first and second inverters corresponding to the first and second winding sets, respectively; and a control unit including a command calculation unit that calculates first and second voltage command values related to voltages to be applied to the first and second winding sets, and an excess correction unit that corrects first and second voltage command corresponding values corresponding to the first and second voltage command values. When one of the first and second voltage command corresponding values exceeds a limitation value which is set in accordance with a voltage capable of being outputted, the excess correction unit performs an excess correction process for correcting the other of the first and second voltage command corresponding values in accordance with an excess amount over the limitation value.

7 Claims, 25 Drawing Sheets

(56) References Cited

U.S. PATENT DOCUMENTS

| | | | |
|---|---|---|---|
| 2014/0203756 A1* | 7/2014 | Kajiura | H02P 27/08 318/812 |
| 2015/0075898 A1* | 3/2015 | Suzuki | B62D 5/0472 180/443 |
| 2016/0006387 A1* | 1/2016 | Nakamura | H02P 29/032 701/43 |

* cited by examiner

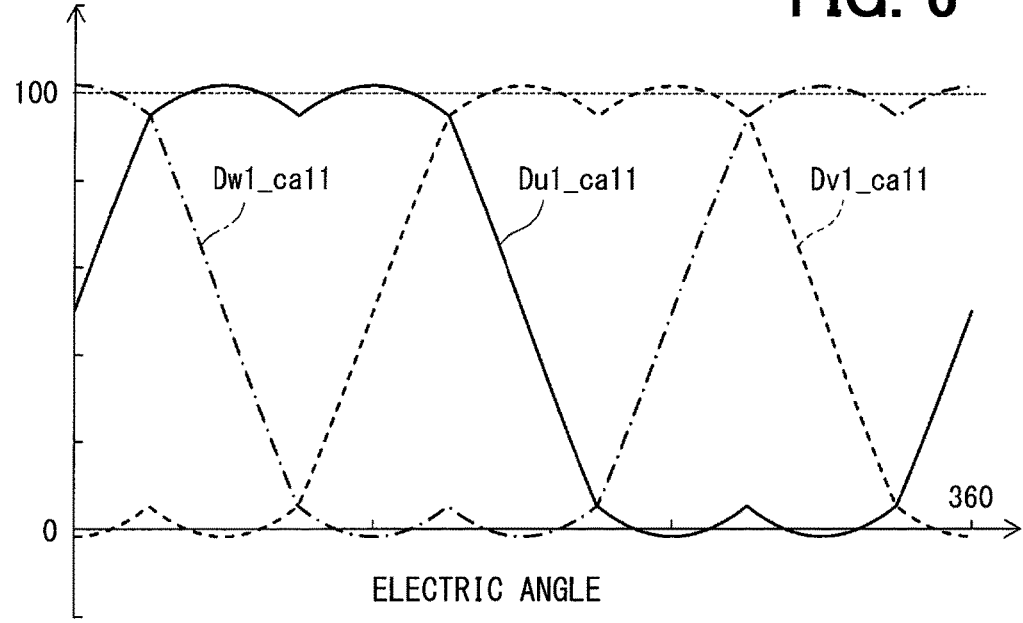
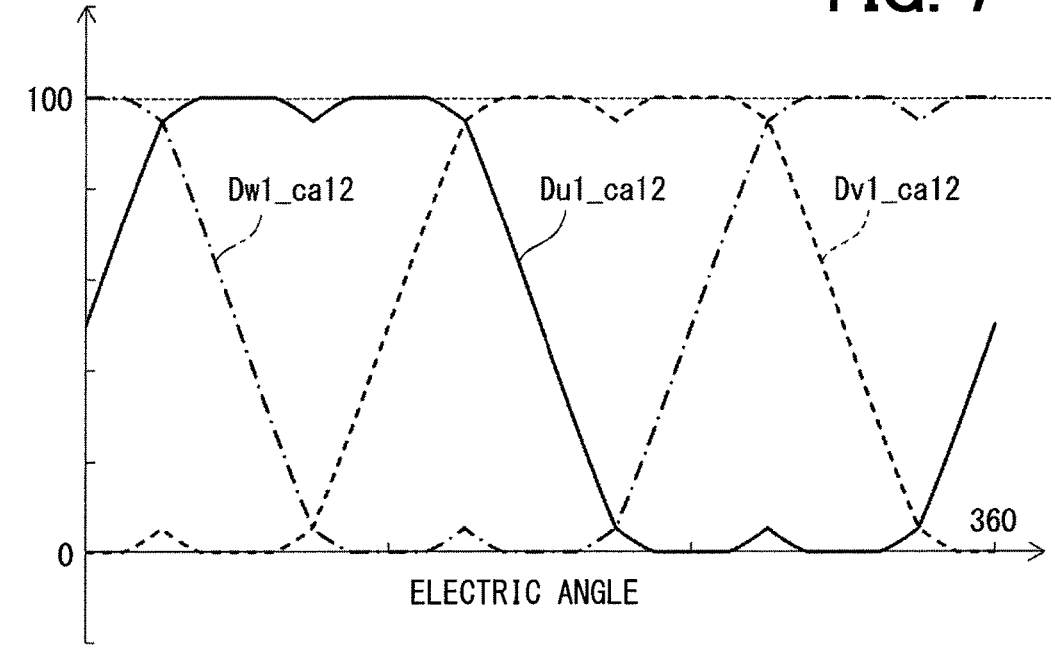

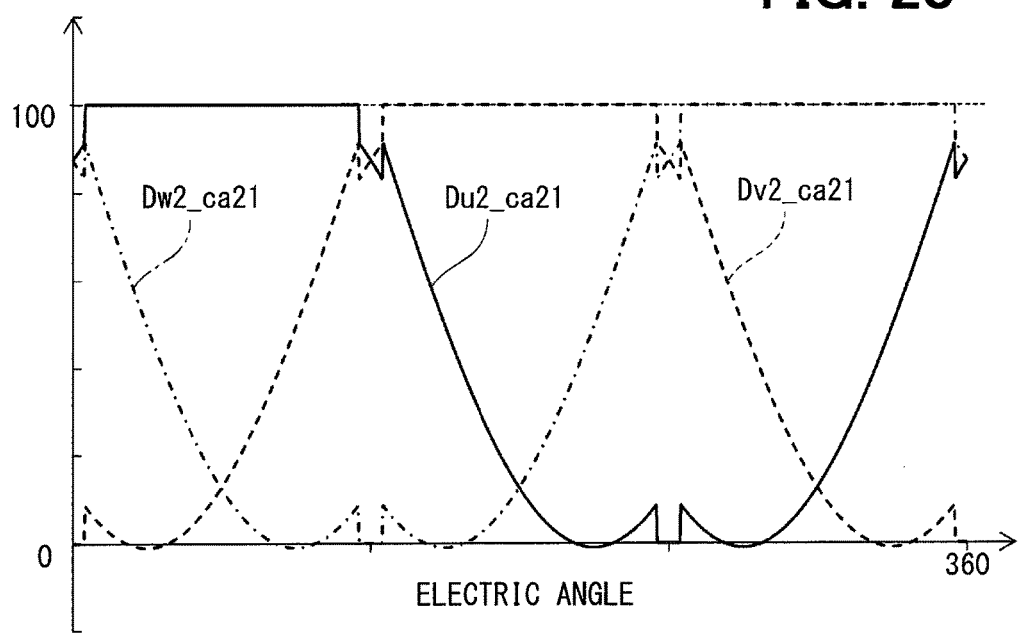
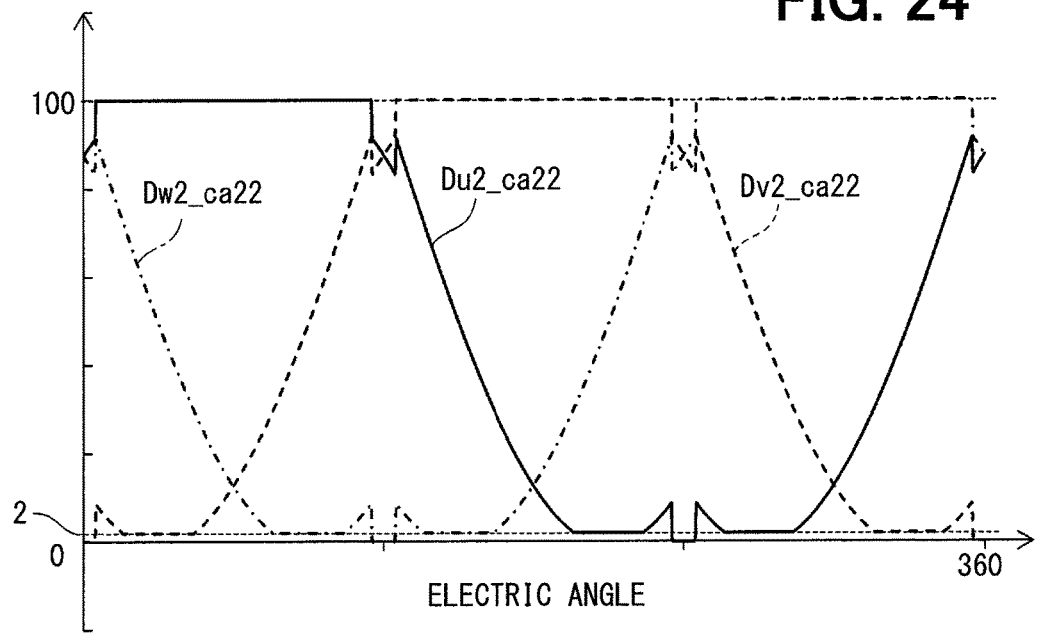

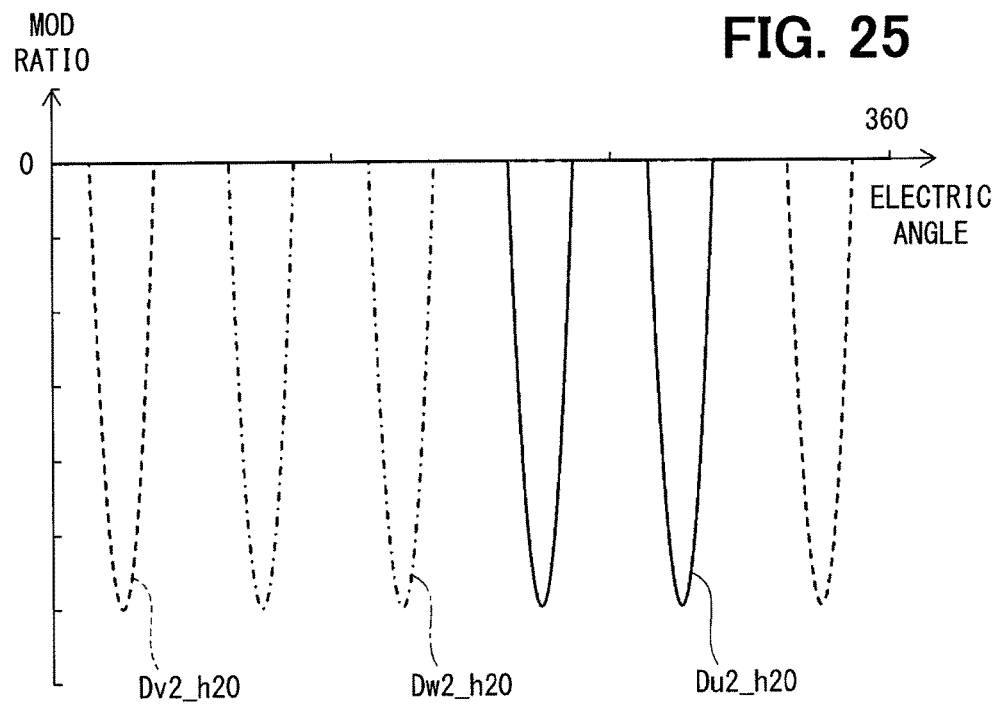
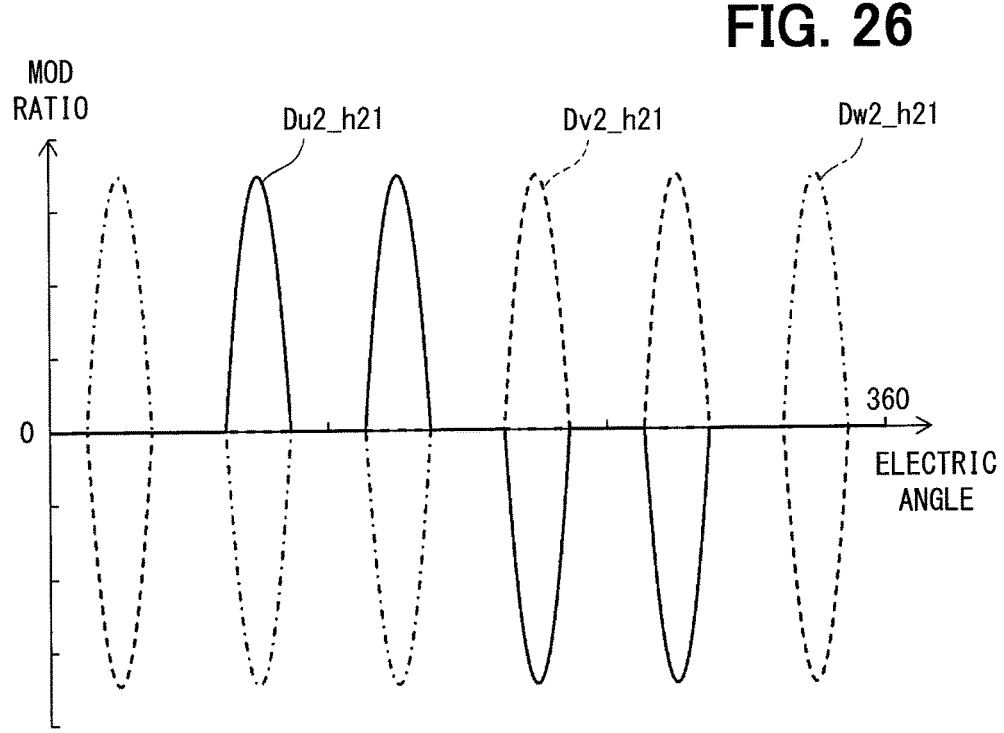

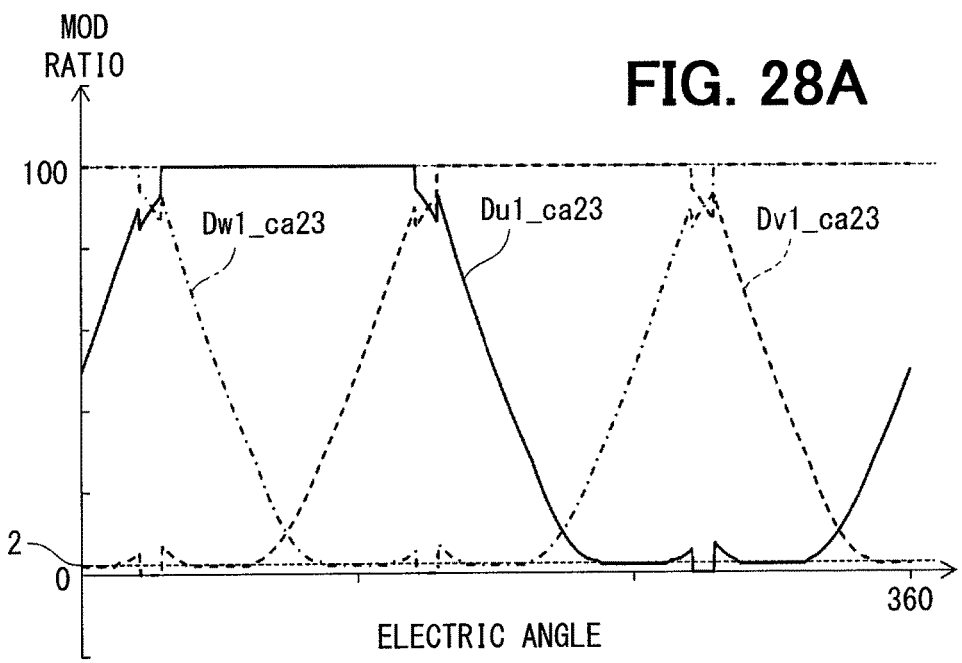
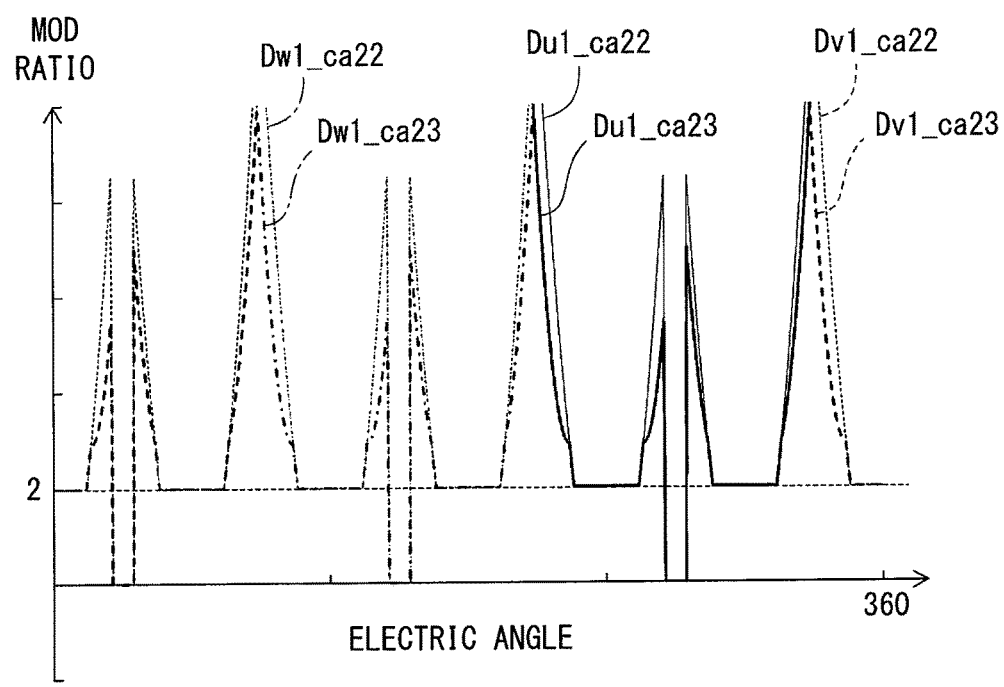

POWER CONVERTER

CROSS REFERENCE TO RELATED APPLICATION

This application is based on Japanese Patent Application No. 2015-141982 filed on Jul. 16, 2015, the disclosure of which is incorporated herein by reference.

TECHNICAL FIELD

The present disclosure relates to a power converter.

BACKGROUND

There has hitherto been known a motor drive device for driving a multi-winding motor including a plurality winding sets. For example, in Patent Literature 1, a fifth-order higher harmonic wave and a seventh-order higher harmonic wave are superimposed to lower a voltage peak so as to suppress torque ripple.

In Patent Literature 1, a current phase needs to be obtained so as to perform correction by use of the fifth-order and seventh-order higher harmonic wave components, leading to a relatively large calculation load. Further, in the process of calculating the fifth-order and seventh-order higher harmonic wave components, a calculation error may occur. Thus, there is a possibility that torque ripple cannot be controlled appropriately due to the calculation error.

Patent Literature 1: JP-2014-121189-A

SUMMARY

It is an object of the present disclosure to provide a power converter capable of improving a voltage utilization rate while minimizing current ripple.

According to an aspect of the present disclosure, a power converter, for converting electric power of a three-phase electric rotary machine including a first winding set and a second winding set, includes: a first inverter corresponding to the first winding set; a second inverter corresponding to the second winding set; and a control unit including a command calculation unit that calculates a first voltage command value related to a voltage to be applied to the first winding set and a second voltage command value related to a voltage to be applied to the second winding set, and an excess correction unit that corrects a first voltage command corresponding value corresponding to the first voltage command value and a second voltage command corresponding value corresponding to the second voltage command value. When one of the first voltage command corresponding value and the second voltage command corresponding value exceeds a limitation value, which is set in accordance with a voltage capable of being outputted, the excess correction unit performs an excess correction process for correcting the other of the first voltage command corresponding value and the second voltage command corresponding value in accordance with an excess amount over the limitation value.

When one of the first voltage command corresponding value and the second voltage command corresponding value exceeds a limitation value which is set in accordance with a voltage that can be outputted, the excess correction unit performs an excess correction process for correcting the other of the first voltage command corresponding value and the second voltage command corresponding value in accordance with an excess amount over the limitation value. In this case, when a combination of the winding set and the inverter is referred to as a system, in a case where a voltage command corresponding value of one system exceeds the limitation value which is set in accordance with a voltage that can be outputted, the other system compensates the excess. Hence it is possible to improve a voltage utilization rate while minimizing current ripple.

BRIEF DESCRIPTION OF THE DRAWINGS

The above and other objects, features and advantages of the present disclosure will become more apparent from the following detailed description made with reference to the accompanying drawings. In the drawings:

FIG. 6 is a diagram for explaining a first neutral-point voltage change value according to the first embodiment of the present disclosure;

FIG. 7 is a diagram for explaining a first upper-lower limit limitation processing value according to the first embodiment of the present disclosure;

FIG. 23 is a diagram for explaining a second neutral-point voltage change value according to the second embodiment of the present disclosure;

FIG. 24 is a diagram for explaining a second upper-lower limit limitation processing value according to the second embodiment of the present disclosure;

FIG. 25 is a diagram for explaining a second excess amount according to the second embodiment of the present disclosure;

FIG. 26 is a diagram for explaining a second phase conversion amount according to the second embodiment of the present disclosure;

FIGS. 28A and 28B are diagrams for explaining a first excess correction value according to the second embodiment of the present disclosure;

DETAILED DESCRIPTION

Hereinafter, a power converter according to the present disclosure is described on the basis of the drawings. In a plurality of embodiments below, substantially the same configurations are provided with the same numeral, and a repeated description thereof is omitted.

First Embodiment

Figure 1:
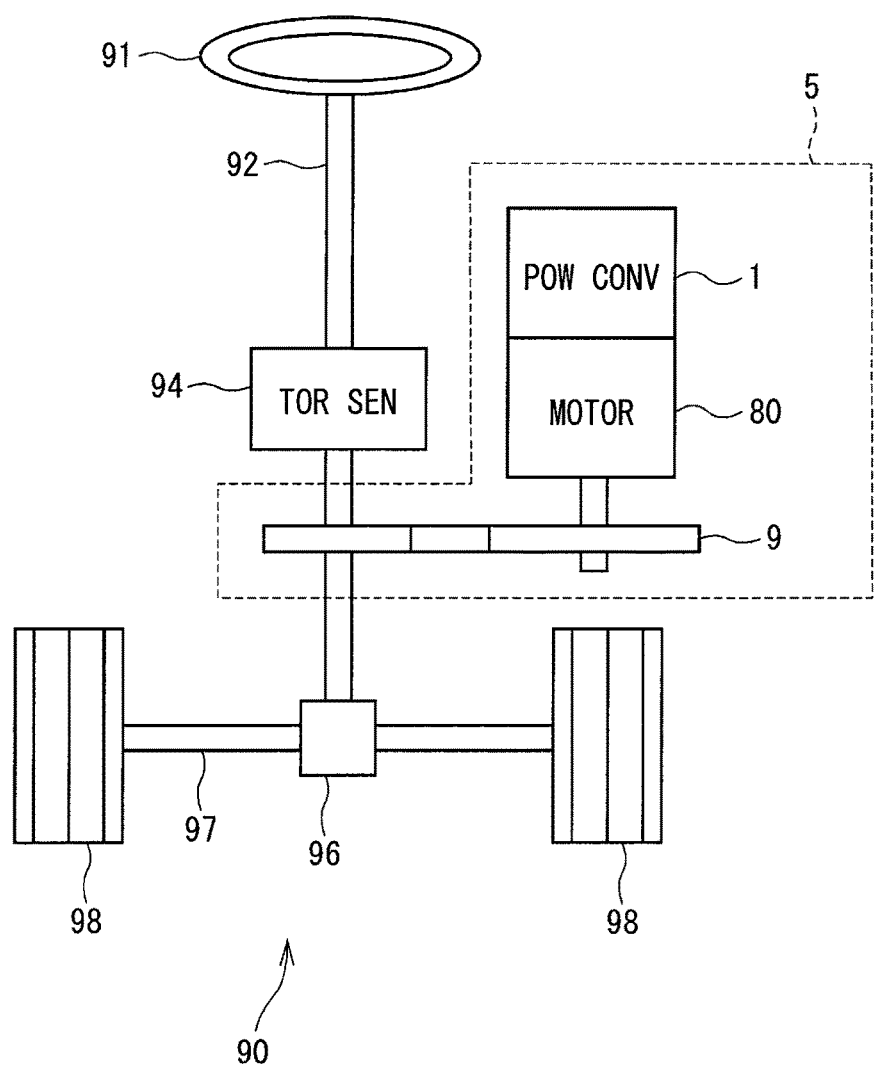
FIG. 1 is a schematic configuration diagram showing a configuration of an electric power steering system according to a first embodiment of the present disclosure.

A power converter according to the first embodiment of the present disclosure will be described with reference to FIGS. 1 to 15. A power converter 1 of the present embodiment is applied to an electric power steering device 5 for assisting steering operation by a driver along with a motor 80 as an electric rotary machine. FIG. 1 shows a whole configuration of a steering system 90 including the electric power steering device 5. The steering system 90 includes a steering wheel 91 as a steering member, a steering shaft 92, a pinion gear 96, a rack shaft 97, a pair of wheels 98, the electric power steering device 5, and the like.

The steering wheel 91 is connected with the steering shaft 92. The steering shaft 92 is provided with a torque sensor 94 for detecting steering torque that is inputted by the driver operating the steering wheel 91. The pinion gear 96 is provided at the tip of the steering shaft 92 and meshes with the rack shaft 97. The wheels 98 are coupled to the respective ends of the rack shaft 97 through a tie rod or the like.

When the driver rotates the steering wheel 91, the steering shaft 92 connected to the steering wheel 91 is rotated. The pinion gear 96 converts the rotational motion of the steering shaft 92 to linear motion of the rack shaft 97, and the pair of wheels 98 is steered at an angle corresponding to a displacement amount of the rack shaft 97.

The electric power steering device 5 includes: the motor 80 for outputting assistance torque that assists steering of the steering wheel 91 by the driver; the power converter 1 used for drive control of the motor 80; a reduction gear 9 being a power transmission member that reduces the rotation of the motor 80 and transmits the rotation to the steering shaft 92 or the rack shaft 97; and the like.

Figure 2:
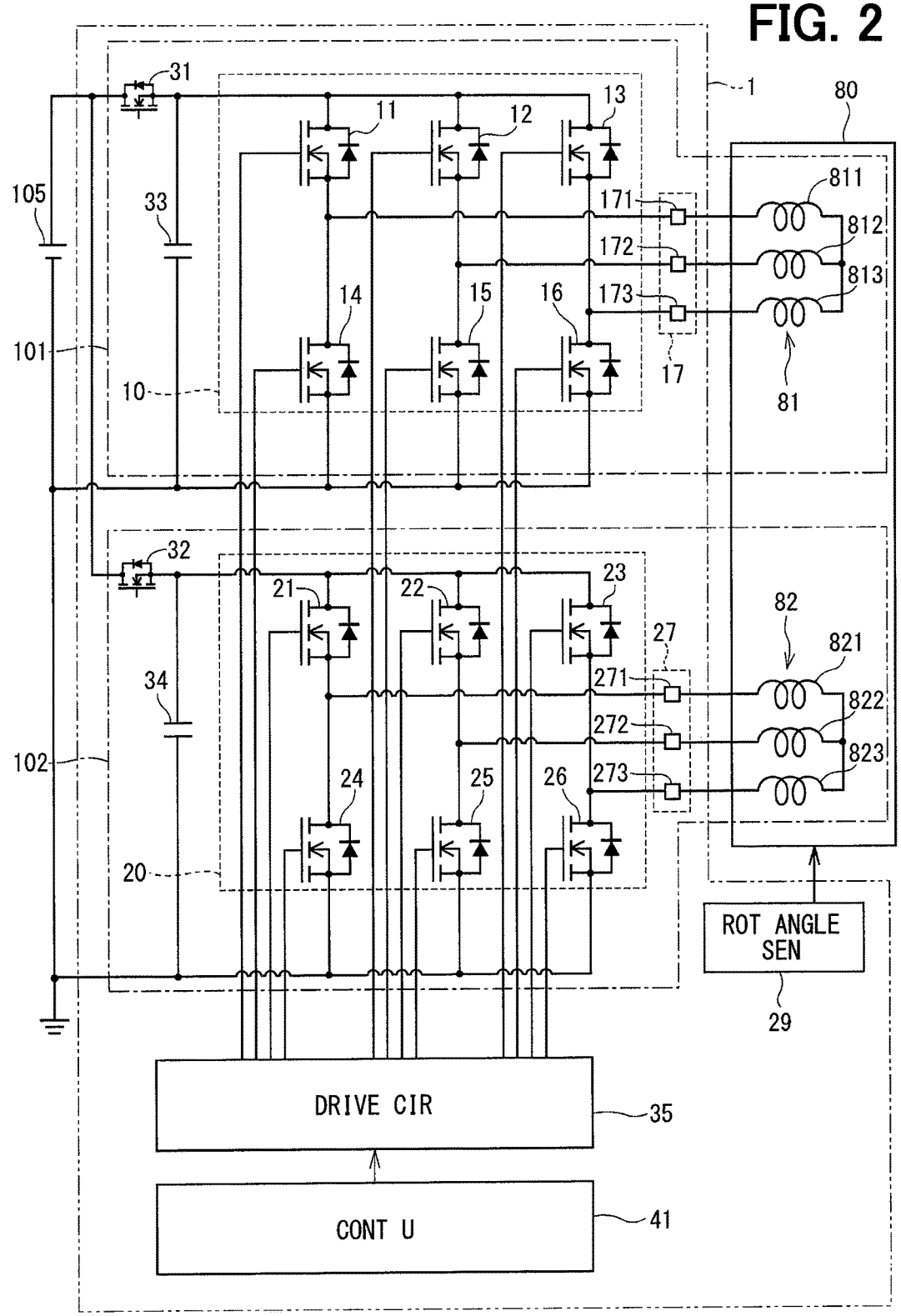
FIG. 2 is a circuit diagram for explaining an electric configuration of a power converter according to the first embodiment of the present disclosure.

By being supplied with power from a battery 105 (see FIG. 2) that is a DC power supply, the motor 80 is driven to normally or reversely rotate the reduction gear 9. Hereinafter, a voltage of the battery 105 is referred to as a power supply voltage Vb. As shown in FIG. 2, the motor 80 is a three-phase blushless motor, including a rotor and stator, neither shown. The rotor is a cylindrical member, with a permanent magnet stuck to its surface, and has magnetic poles. Winding sets 81, 82 are wound on the stator. The first winding set 81 has a U1 coil 811, a V1 coil 812, and a W1 coil 813. The second winding set 82 has a U2 coil 821, a V2 coil 822, and a W2 coil 823. The U1 coil 811 and the U2 coil 821 are disposed in positions with phases displaced by 30[°]. This also applies to the V-phase and the W-phase. Hence in the present embodiment, the first winding set 81 and the second winding set are electrically conducted with the phases displaced by 30[°].

The power converter 1 includes a first inverter 10, a second inverter 20, current detection units 17, 27, a rotation angle sensor 29, power supply relays 31, 32, a control unit 41, and the like. The first inverter 10 has six switching elements 11 to 16 and converts a current toward the first winding set 81. Hereinafter, a "switching element" is referred to as an "SW element." The SW elements 11 to 13 are connected to the high potential side, and the SW elements 14 to 16 are connected to the low potential side. A connection point of the U-phase SW elements 11, 14 in pair is connected with one end of the U1 coil 811. A connection point of the V-phase SW elements 12, 15 in pair is connected with one end of the V1 coil 812. A connection point of the W-phase SW elements 13, 16 in pair is connected with one end of the W1 coil 813.

The second inverter 20 has six SW elements 21 to 26 and converts a current toward the second winding set 82. The SW elements 21 to 23 are connected to the high potential side, and the SW elements 24 to 26 are connected to the low potential side. A connection point of the U-phase SW elements 21, 24 in pair is connected with one end of the U2 coil 821. A connection point of the V-phase SW elements 22, 25 in pair is connected with one end of the V2 coil 822. A connection point of the W-phase SW elements 23, 26 in pair is connected with one end of the W2 coil 823. Each of the SW elements 11 to 16, 21 to 26 of the present embodiment is a MOSFET (Metal-Oxide-Semiconductor Field-Effect Transistor), but may be an IGBT (Insulated Gate Bipolar Transistor), a thyristor, or the like. In the present embodiment, the SW elements 11 to 13, 21 to 23 correspond to the "high-potential-side switching element", and the SW elements 14 to 16, 24 to 26 correspond to the "low-potential-side switching element."

The first current detection unit 17 has current detection elements 171, 172, 173. The U1 current detection element 171 is provided on a connection line between the connection point of the U-phase SW elements 11, 14 and the U1 coil 811, and detects a current in the U1 coil 811. The V1 current detection element 172 is provided on a connection line between the connection point of the V-phase SW elements 12, 15 and the V1 coil 812, and detects a current in the V1 coil 812. The W1 current detection element 173 is provided on a connection line between the connection point of the W-phase SW elements 13, 16 and the W1 coil 813, and detects a current in the W1 coil 813. A detection value of the current flowing in the U1 coil 811 is referred to as a U1 current detection value Iu1. A detection value of the current flowing in the V1 coil 812 is referred to as a V1 current detection value Iv1. A detection value of the current flowing in the W1 coil 813 is referred to as a W1 current detection value Iw1.

The second current detection unit 27 has current detection elements 271, 272, 273. The U2 current detection element 271 is provided on a connection line between the connection point of the U-phase SW elements 21, 24 and the U2 coil 821, and detects a current in the U2 coil 821. The V2 current detection element 272 is provided on a connection line between the connection point of the V-phase SW elements 22, 25 and the V2 coil 822, and detects a current in the V2 coil 822. The W2 current detection element 273 is provided on a connection line between the connection point of the W-phase SW elements 23, 26 and the W2 coil 823, and detects a current in the W2 coil 823. A detection value of the current flowing in the U2 coil 821 is referred to as a U2 current detection value Iu2. A detection value of the current flowing in the V2 coil 822 is referred to as a V2 current detection value Iv2. A detection value of the current flowing in the W2 coil 823 is referred to as a W2 current detection value Iw2. The current detection elements 171 to 173, 271 to 273 of the present embodiment are hall elements. The rotation angle sensor 29 detects a rotation angle of the motor 80. An electric angle $\theta$ of the motor 80, detected by the rotation angle sensor 29, is outputted to the control unit 41.

The first power supply relay 31 can cut off power supply from the battery 105 to the first inverter 10. The second power supply relay 32 can cut off power supply from the battery 105 to the second inverter 20. In the present embodiment, each of the power supply relays 31, 32 is a MOSFET similarly to the SW element 11 and the like, but may be an IGBT, a mechanical relay, or the like. Further, in the case of using the MOSFETs for the power supply relays 31, 32, it is preferable to provide a reverse-connection protection relay, not shown, which is connected in series with the power supply relays 31, 32 so as to reverse a direction of a parasitic diode in order that, when the battery 105 is erroneously connected in a reverse direction, a current is prevented from flowing in the reverse direction through the parasitic diode.

The first capacitor 33 is connected in parallel with the battery 105 and the first inverter 10. The second capacitor 34 is connected in parallel with the battery 105 and the second inverter 20. The capacitors 33, 34 store charges, to assist power supply to the inverters 10, 20, and suppress a noise component such as a surge current.

In the present embodiment, the first winding set 81, the first inverter 10 related to conduction control for the first winding set 81, the first current detection unit 17, the first power supply relay 31, and the first capacitor 33 are taken as a "first system 101." Further, the second winding set 82, the second inverter 20 related to conduction control for the second winding set 82, the second current detection unit 27, the second power supply relay 32, and the second capacitor 34 are taken as a "second system 102."

The control unit 41 controls the whole of the power converter 1, and includes a microcomputer or the like which performs a variety of calculations. Each process by the control unit 41 may be a software process performed by running a previously stored program in a CPU, or may be a hardware process performed by use of a dedicated electronic circuit. The control unit 41 generates a control signal for controlling the on-off of each of the SW elements 11 to 16, 21 to 26 on the basis of the steering torque acquired from the torque sensor 94 (see FIG. 1), the electric angle $\theta$ acquired from the rotation angle sensor 29, and the like. The generated control signal is outputted to gates of the SW elements 11 to 16, 21 to 26 through a drive circuit 35.

Figure 3:
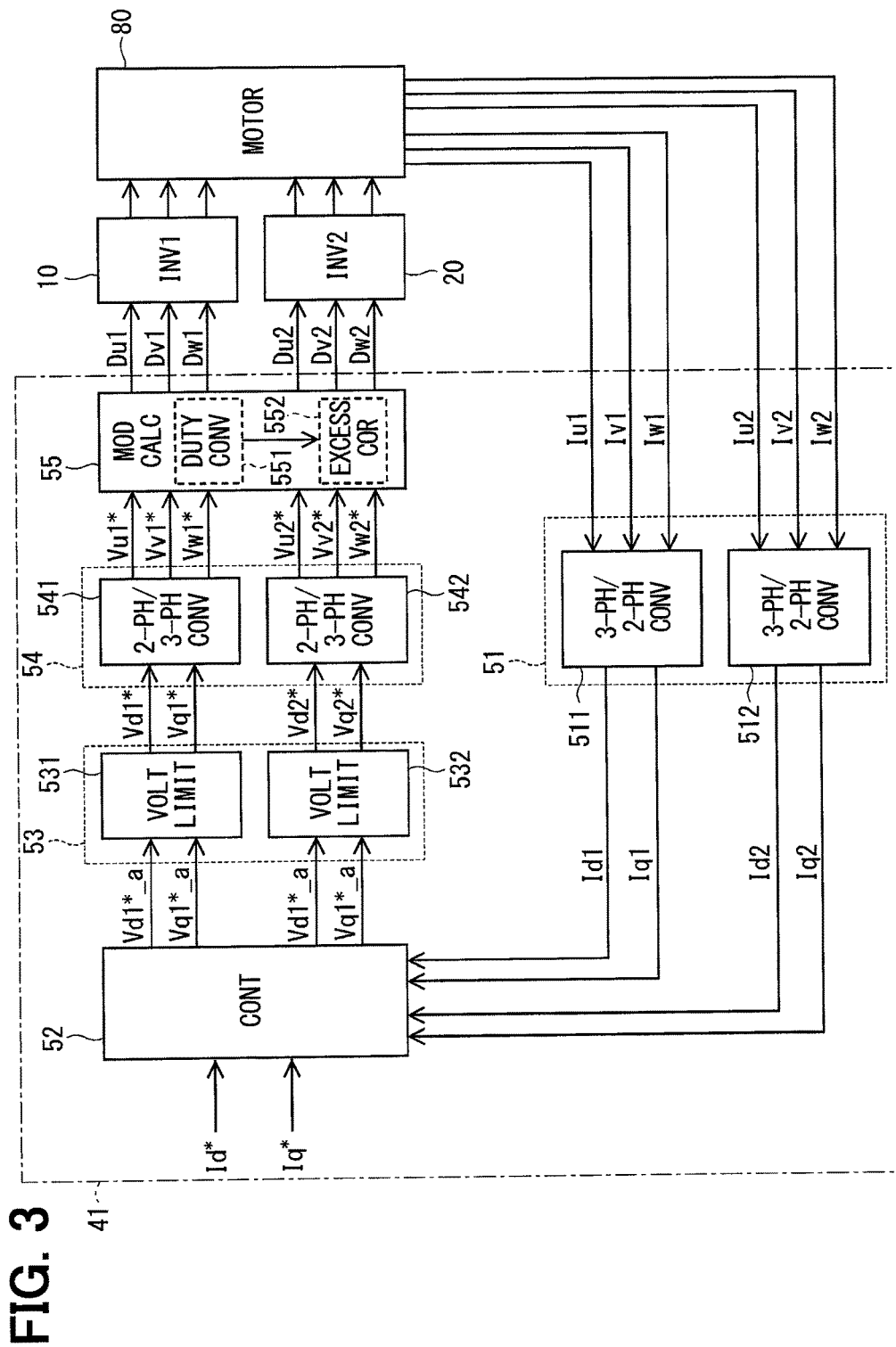
FIG. 3 is a block diagram for explaining a control unit according to the first embodiment of the present disclosure.

As shown in FIG. 3, the control unit 41 has a three-phase to two-phase conversion unit 51, a controller 52, a voltage limitation unit 53, a two-phase to three-phase conversion unit 54, a modulation calculation unit 55, and the like.

The three-phase to two-phase conversion unit 51 has a first-system three-phase to two-phase conversion unit 511, and a second-system three-phase to two-phase conversion unit 512. The first-system three-phase to two-phase conversion unit 511 performs dq conversion on the U1 current detection value Iu1, the V1 current detection value Iv1, and the W1 current detection value Iw1, acquired from the first current detection unit 17, on the basis of the electric angle $\theta$ and calculates a first d-axis current detection value Id1 and a first q-axis current detection value Iq1. The second-system three-phase to two-phase conversion unit 512 performs dq conversion on the U2 current detection value Iu2, the V2 current detection value Iv2, and the W2 current detection value Iw2, acquired from the second current detection unit 27, on the basis of the electric angle $\theta$ and calculates a second d-axis current detection value Id2 and a second q-axis current detection value Iq2.

On the basis of a d-axis current command value Id* and a q-axis current command value Iq* in accordance with a torque command value, the d-axis current detection values Id1, Id2, and the q-axis current detection values Iq1, Iq2, the controller 52 calculates a first pre-limitation d-axis voltage command value Vd1*_a, a first pre-limitation q-axis voltage command value Vq1*_a, a second pre-limitation d-axis voltage command value Vd2*_a, and a second pre-limitation q-axis voltage command value Vq2*_a, by PI calculation or the like.

The voltage limitation unit 53 has a first voltage limitation unit 531 and a second voltage limitation unit 532, and limits a voltage by use of an amplitude of a d-q axis voltage. The first voltage limitation unit 531 limits the first pre-limitation d-axis voltage command value Vd1*_a and the first pre-limitation q-axis voltage command value Vq1*_a, and calculates a first d-axis voltage command value Vd1* and a first q-axis voltage command value Vq1*. The second voltage limitation unit 532 limits the second pre-limitation d-axis voltage command value Vd2*_a and the second pre-limitation q-axis voltage command value Vq2*_a, and calculates a second d-axis voltage command value Vd2* and a second q-axis voltage command value Vq2*.

Figure 4:
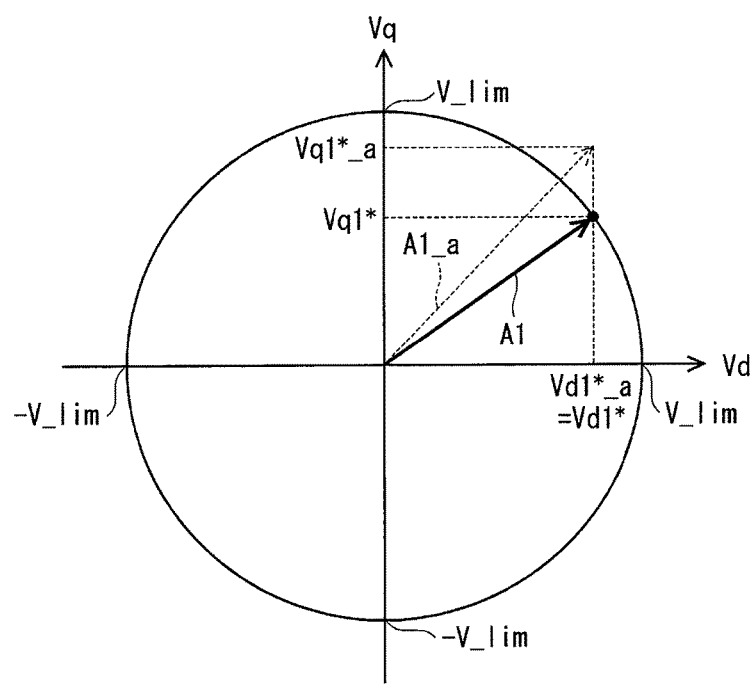
FIG. 4 is a diagram for explaining a voltage control process according to the first embodiment of the present disclosure.

A voltage limitation process in the first voltage limitation unit 531 will be described here with reference to FIG. 4. A process in the second voltage limitation unit 532 is similar to the process in the first voltage limitation unit 531, and hence a description thereof is omitted. A voltage vector with a d-axis component being the first pre-limitation d-axis voltage command value Vd1*_a and with a q-axis component being the first pre-limitation q-axis voltage command value Vq1*_a is referred to as a first pre-limitation voltage vector A1_a. When the magnitude of the first pre-limitation voltage vector A1_a is not larger than an amplitude limitation value V_lim, the first pre-limitation d-axis voltage command value Vd1*_a is set to the first d-axis voltage command value Vd1*, and the first pre-limitation q-axis voltage command value Vq1*_a is set to the first q-axis voltage command value Vq1*. Further, as shown in FIG. 4, when the magnitude of the first pre-limitation voltage vector A1_a is larger than the amplitude limitation value V_lim, the first pre-limitation d-axis voltage command value Vd1*_a is set to the first d-axis voltage command value Vd1*, and the q-axis component is limited such that the voltage vector A1 after limitation reaches the amplitude limitation value V_lim, and the obtained value is set to the first q-axis voltage command value Vq1*.

The amplitude limitation value V_lim at d-q axis coordinates is calculated by Formula (1). For example, when the power supply voltage Vb is set to 12[V] and a duty maximum value Dmax is set to 103.5[%], the amplitude limitation value V_lim is about 8.87[V]. In the case of not performing an excess correction process which is described later, the duty maximum value Dmax is 100[%], and the amplitude limitation value V_lim is about 8.49[V].

$$V\_lim = Vb \times (\sqrt{2}) \times Dmax/100 \quad (1)$$

The duty maximum value Dmax is previously set by calculation performed off line such that the value becomes a value that can be outputted when the excess correction process described later is performed. In the present embodiment, the current detection elements 171 to 173, 271 to 273 are taken as the hall elements and the currents in the winding sets 81, 82 are directly detected, and the duty is usable up to 100[%]. When the current is detected using a shunt resistor as in a second embodiment described later, the duty is usable only up to a predetermined maximum duty width (e.g., 93[%]). In that case, the duty maximum value Dmax is a value obtained by multiplying the predetermined maximum duty width by 103.5[%], and the amplitude limitation value V_lim is also a different value.

The two-phase to three-phase conversion unit 54 has a first-system two-phase to three-phase conversion unit 541, and a second-system two-phase to three-phase conversion unit 542. The first-system two-phase to three-phase conversion unit 541 performs reverse dq conversion on the first d-axis voltage command value Vd1* and the first q-axis voltage command value Vq1* on the basis of the electric angle θ, and calculates a U1 voltage detection value Vu1*, a V1 voltage detection value Vv1*, and a W1 voltage detection value Vw1*. The second-system two-phase to three-phase conversion unit 542 performs reverse dq conversion on the second d-axis voltage command value Vd2* and the second q-axis voltage command value Vq2* on the basis of the electric angle θ, and calculates a U2 voltage command value Vu2*, a V2 voltage command value Vv2*, and a W2 voltage command value Vw2*.

Hereinafter, the U1 voltage command value Vu1*, the V1 voltage command value Vv1*, and the W1 voltage command value Vw1* are appropriately referred to as "(first) voltage command values Vu1*, Vv1*, Vw1*. The U2 voltage command value Vu2*, the V2 voltage command value Vv2*, and the W2 voltage command value Vw2* are appropriately referred to as "(second) voltage command values Vu2*, Vv2*, Vw2*.

The modulation calculation unit 55 calculates duty command values Du1, Dv1, Dw1, Du2, Dv2, Dw2 on the basis of the voltage command values Vu1*, Vv1*, Vw1*, Vu2*, Vv2*, Vw2*. The duty command values Du1, Dv1, Dw1, Du2, Dv2, Dw2 are outputted to the inverters 10, 20 through the drive circuit 35 (not shown in FIG. 3).

The modulation calculation unit 55 has a duty conversion unit 551 and an excess correction unit 552. The duty conversion unit 551 performs duty conversion on the first voltage command values Vu1*, Vv1*, Vw1* and calculates first duty conversion values Du1_c, Dv1_c, Dw1_c. Further, the duty conversion unit 551 performs duty conversion on the second voltage command values Vu2*, Vv2*, Vw2* and calculates second duty conversion values Du2_c, Dv2_c, Dw2_c. The excess correction unit 552 performs an excess correction process in which, the excess over a limitation value of the voltage that can be outputted from the first system 101 is compensated in the second system 102 side, and the excess over a limitation value of the voltage that can be outputted from the second system 102 is compensated in the first system 101 side. This process enhances the voltage utilization rate.

The excess correction process of the present embodiment will be described with reference to a flowchart shown in FIG. 5. The excess correction process of the present embodiment is performed by the excess correction unit 552. In Step S101, the excess correction unit 552 decides a maximum duty MaxD1 that is the largest of the first duty conversion values Du1_c, Dv1_c, Dw1_c obtained by performing the duty conversion on the first voltage command values Vu1*, Vv1*, Vw1*. Hereinafter, "Step" in "Step S101" is omitted and "S101" is put down. This also applies to the other steps.

In S102, the excess correction unit 552 decides a minimum duty MinD1 that is the smallest of the first duty conversion values Du1_c, Dv1_c, Dw1_c. In S103, the excess correction unit 552 decides an intermediate duty MidD1. The intermediate duty MidD1 is expressed by Formula (2). In Formula (2), "150" represents that, when a center value of each phase duty is 50[%], a sum of the three phase duties is 150. This also applies to Formula (6).

$$MidD1 = 150 - MaxD1 - MinD1 \quad (2)$$

In S104, the excess correction unit 552 calculates first neutral-point voltage change values Du1_ca11, Dv1_ca11, Dw1_ca11. The first neutral-point voltage change values Du1_ca11, Dv1_ca11, Dw1_ca11 are calculated by Formulas (3-1), (3-2), (3-3), respectively. In the calculation process here, the neutral-point voltage is changed by making the maximum and minimum duties equal. Even when the neutral-point voltage is changed, it does not affect the drive of the motor 80 unless a line voltage is changed. The first neutral-point voltage change values Du1_ca11, Dv1_ca11, Dw1_ca11 are as shown in FIG. 6. In FIG. 6, a value related to the U-phase is indicated by a solid line, a value related to the V-phase is indicated by a broken line, and a value related to the W-phase is indicated by a dashed line. This also applies to the other drawings described later.

$$Du1\_ca11 = Du1\_c - MidD1 \times 0.5 + 50 \quad (3\text{-}1)$$

$$Dv1\_ca11 = Dv1\_c - MidD1 \times 0.5 + 50 \quad (3\text{-}2)$$

$$Dw1\_ca11 = Dw1\_c - MidD1 \times 0.5 + 50 \quad (3\text{-}3)$$

In S105, the excess correction unit 552 limits the first neutral-point voltage change values Du1_ca11, Dv1_ca11, Dw1_ca11 so as to be within the range of a predetermined lower limit value RL1 to a predetermined upper limit value RH1, and calculates first upper-lower limit limitation processing values Du1_*ca*12, Dv1_*ca*12, Dw1_*ca*12. When the first neutral-point voltage change value Du1_*ca*11 is not smaller than the lower limit value RL1 and not larger than the upper limit value RH1, the first neutral-point voltage change value Du1_*ca*11 is taken as the upper-lower limit limitation processing value Du1_*ca*12. When the first neutral-point voltage change value Du1_*ca*11 is smaller than the lower limit value RL1, the lower limit value RL1 is set to the first upper-lower limit limitation processing values Du1_*ca*12. When the first neutral-point voltage change value Du1_*ca*11 is larger than the upper limit value RH1, the upper limit value RH1 is set to the first upper-lower limit limitation processing values Du1_*ca*12. This also applies to the first upper-lower limit limitation processing values Dv1_*ca*12, Dw1_*ca*12.

The first upper-lower limit limitation processing values Du1_*ca*12, Dv1_*ca*12, Dw1_*ca*12 are as shown in FIG. 7. FIG. 7 is an example where the lower limit value RL1 is 0[%] and the upper limit value RH1 is 100[%]. This also applies to FIG. 11 described later. The lower limit value RL1 and the upper limit value RH1 are arbitrarily settable. For example, considering the dead time, the on-time required for the current detection, and the like, the lower limit value RL1 may be set to 4[%] and the upper limit value RH1 may be set to 93[%].

Figure 8:
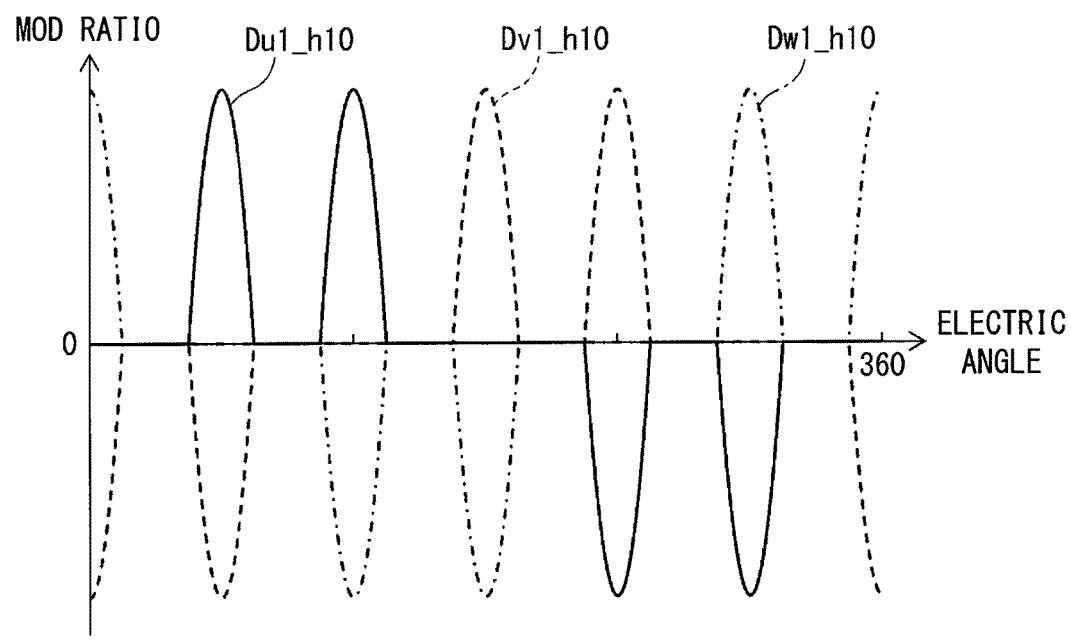
FIG. 8 is a diagram for explaining a first excess amount according to the first embodiment of the present disclosure.

In S106, the excess correction unit 552 calculates first excess amounts Du1_*h*10, Dv1_*h*10, Dw1_*h*10. The first excess amounts Du1_*h*10, Dv1_*h*10, Dw1_*h*10 are amounts by which the first neutral-point voltage change values Du1_*ca*11, Dv1_*ca*11, Dw1_*ca*11 exceed the lower limit value RL1 or the upper limit value RH1, and are expressed by Formulas (4-1), (4-2), (4-3), respectively. Further, the first excess amounts Du1_*h*10, Dv1_*h*10, Dw1_*h*10 are as shown in FIG. 8. FIG. 8 shows a modulation ratio around 0[%] in an enlarged form. This also applies to FIGS. 9, 12, 13, and the like.

$$Du1\_h10 = Du1\_ca11 - Du1\_ca12 \tag{4-1}$$

$$Dv1\_h10 = Dv1\_ca11 - Dv1\_ca12 \tag{4-2}$$

$$Dw1\_h10 = Dw1\_ca11 - Dw1\_ca12 \tag{4-3}$$

In S107, the excess correction unit 552 calculates first correction amounts Du1_*h*11, Dv1_*h*11, Dw1_*h*11 that are values obtained by converting the first excess amounts Du1_*h*10, Dv1_*h*10, Dw1_*h*10 to the coordinate system of the second system 102 by use of a rotation matrix. The first correction amounts Du1_*h*11, Dv1_*h*11, Dw1_*h*11 can be calculated by performing the dq conversion on the first excess amounts Du1_*h*10, Dv1_*h*10, Dw1_*h*10 in the coordinate system of the first system 101, and performing the reverse dq conversion on the dq conversion values in the coordinate system of the second system 102. The first correction amounts Du1_*h*11, Dv1_*h*11, Dw1_*h*11 are expressed by Formulas (5-1), (5-2), (5-3), respectively.

$$Du1\_h11 = (Du1\_h10 - Dv1\_h10)/(\sqrt{3}) \tag{5-1}$$

$$Dv1\_h11 = (Dv1\_h10 - Dw1\_h10)/(\sqrt{3}) \tag{5-2}$$

$$Dw1\_h11 = (Dw1\_h10 - Du1\_h10)/(\sqrt{3}) \tag{5-3}$$

Figure 9:
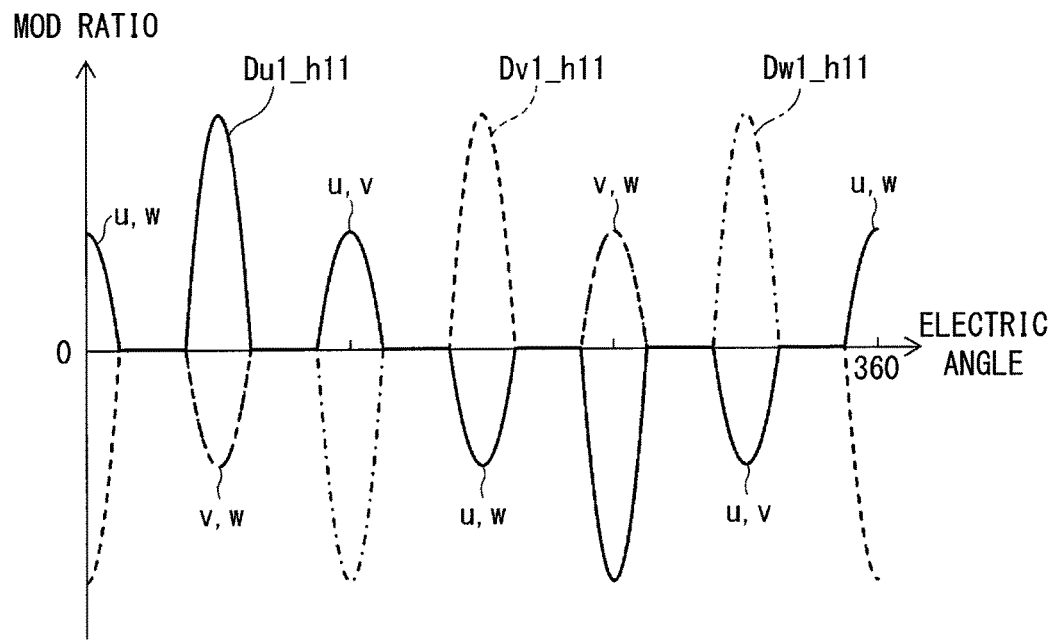
FIG. 9 is a diagram for explaining a first correction amount according to the first embodiment of the present disclosure.

The first correction amounts Du1_*h*11, Dv1_*h*11, Dw1_*h*11 are as shown in FIG. 9. It is to be noted that a place denoted by "u, v" means that Du1_*h*11 and Dv1_*h*11 are the same value, and lines thereof are superimposed. Similarly, "u, w" means that Du1_*h*11 and Dw1_*h*11 are the same value, and "v, w" means that Dv1_*h*11 and Dw1_*h*11 are the same value. This also applies to FIG. 13.

In S108, the excess correction unit 552 decides a maximum duty MaxD2 that is the largest value in the second duty conversion values Du2_*c*, Dv2_*c*, Dw2_*c* obtained by performing the duty conversion on the second voltage command values Vu2*, Vv2*, Vw2*. In S109, the excess correction unit 552 decides a minimum duty MinD2 that is the smallest value in the second duty conversion values Du2_*c*, Dv2_*c*, Dw2_*c*. In S110, the excess correction unit 552 decides an intermediate duty MidD2. The intermediate duty MidD2 is expressed by Formula (6).

$$MidD2 = 150 - MaxD2 - MinD2 \tag{6}$$

Figure 10:
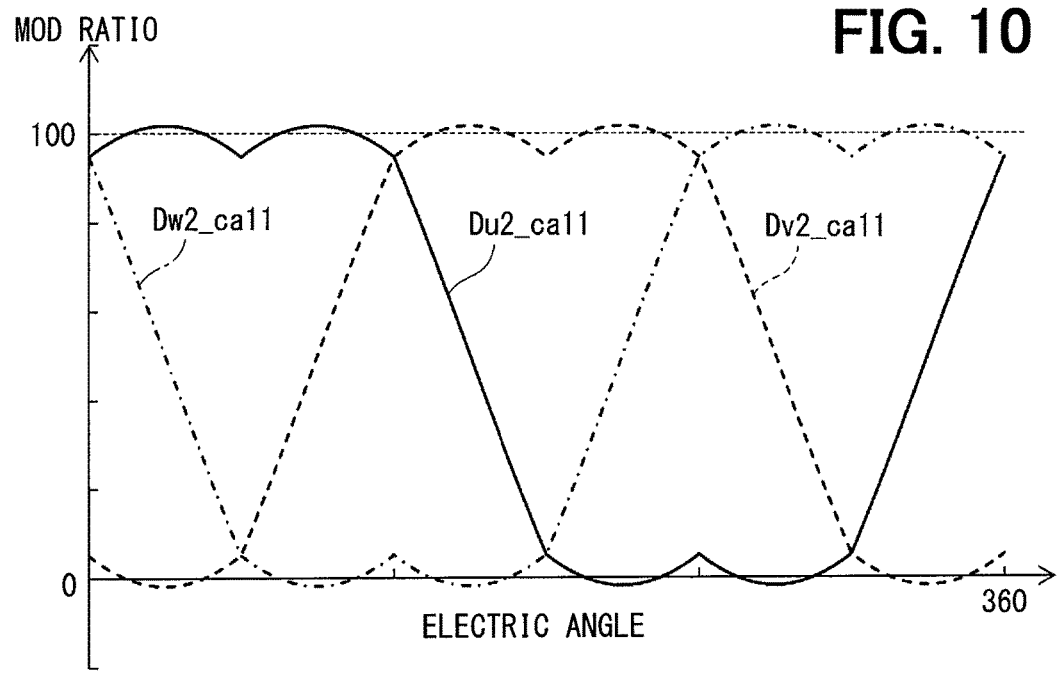
FIG. 10 is a diagram for explaining a second neutral-point voltage change value according to the first embodiment of the present disclosure.

Hereinafter, a detailed description of the processing of S111 to S114 is appropriately omitted since being substantially similar to the processing of S104 to S107. In S111, the excess correction unit 552 calculates second neutral-point voltage change values Du2_*ca*11, Dv2_*ca*11, Dw2_*ca*11. The second neutral-point voltage change values Du2_*ca*11, Dv2_*ca*11, Dw2_*ca*11 are calculated by Formulas (7-1), (7-2), (7-3), respectively. The second neutral-point voltage change values Du2_*ca*11, Dv2_*ca*11, Dw2_*ca*11 are as shown in FIG. 10.

$$Du2\_ca11 = Du2\_c - MidD2 \times 0.5 + 50 \tag{7-1}$$

$$Dv2\_ca11 = Dv2\_c - MidD2 \times 0.5 + 50 \tag{7-2}$$

$$Dw2\_ca11 = Dw2\_c - MidD2 \times 0.5 + 50 \tag{7-3}$$

Figure 11:
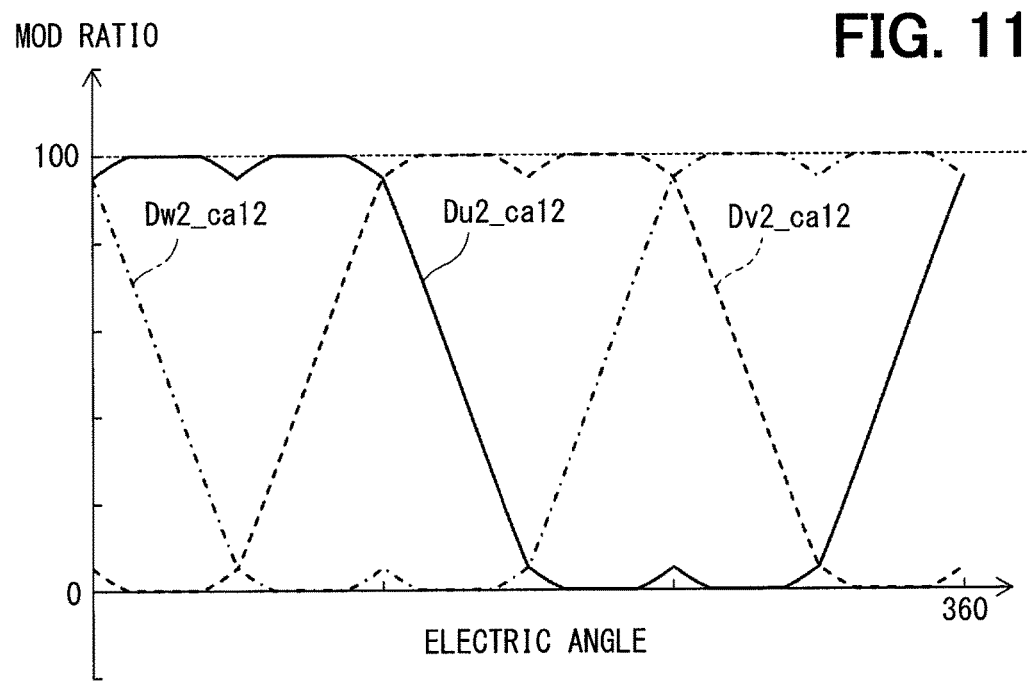
FIG. 11 is a diagram for explaining a second upper-lower limit limitation processing value according to the first embodiment of the present disclosure.

In S112, the excess correction unit 552 limits the second neutral-point voltage change values Du2_*ca*11, Dv2_*ca*11, Dw2_*ca*11 so as to be within the range of the predetermined lower limit value RL1 to the predetermined upper limit value RH1, and calculates second upper-lower limit limitation processing values Du2_*ca*12, Dv2_*ca*12, Dw2_*ca*12. The second upper-lower limit limitation processing values Du2_*ca*12, Dv2_*ca*12, Dw2_*ca*12 are as shown in FIG. 11.

Figure 12:
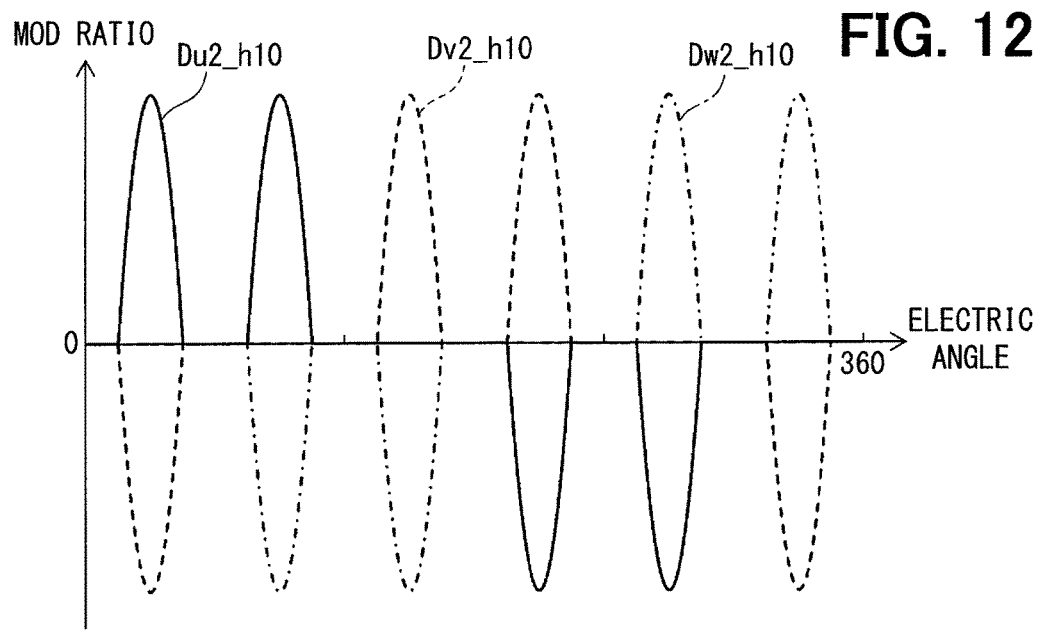
FIG. 12 is a diagram for explaining a second excess amount according to the first embodiment of the present disclosure.

In S113, the excess correction unit 552 calculates second excess amounts Du2_*h*10, Dv2_*h*10, Dw2_*h*10. The second excess amounts Du2_*h*10, Dv2_*h*10, Dw2_*h*10 are amounts by which the second neutral-point voltage change values Du2_*ca*11, Dv2_*ca*11, Dw2_*ca*11 exceed the lower limit value RL1 or the upper limit value RH1, and are expressed by Formulas (8-1), (8-2), (8-3), respectively. Further, the second excess amounts Du2_*h*10, Dv2_*h*10, Dw2_*h*10 are as shown in FIG. 12.

$$Du2\_h10 = Du2\_ca11 - Du2\_ca12 \tag{8-1}$$

$$Dv2\_h10 = Dv2\_ca11 - Dv2\_ca12 \tag{8-2}$$

$$Dw2\_h10 = Dw2\_ca11 - Du2\_ca12 \tag{8-3}$$

Figure 13:
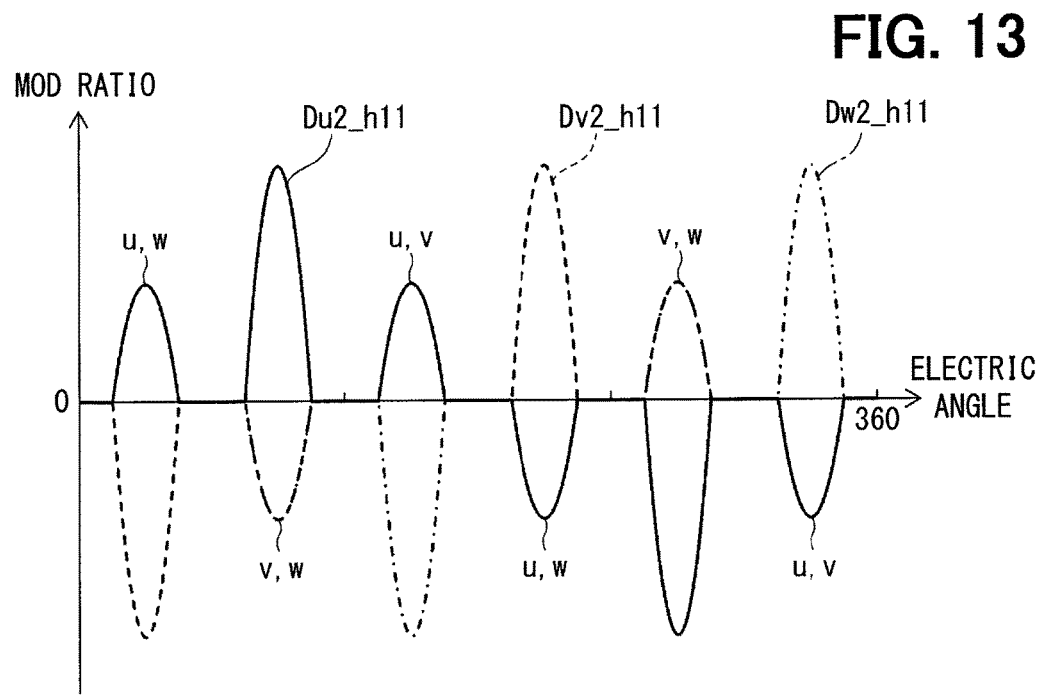
FIG. 13 is a diagram for explaining a second correction amount according to the first embodiment of the present disclosure.

In S114, the excess correction unit 552 calculates second correction amounts Du2_*h*11, Dv2_*h*11, Dw2_*h*11 that are values obtained by converting the second excess amounts Du2_*h*10, Dv2_*h*10, Dw2_*h*10 to the coordinate system of the first system 101 by use of a rotation matrix. The second correction amounts Du2_*h*11, Dv2_*h*11, Dw2_*h*11 can be calculated by performing the dq conversion on the second excess amounts Du2_*h*10, Dv2_*h*10, Dw2_*h*10 in the coordinate system of the second system 102, and performing the reverse dq conversion on the dq conversion values in the coordinate system of the first system 101. The second correction amounts Du2_*h*11, Dv2_*h*11, Dw2_*h*11 are expressed by Formulas (9-1), (9-2), (9-3), respectively. Further, the second correction amounts Du2_*h*11, Dv2_*h*11, Dw2_*h*11 are as shown in FIG. 13.

$$Du2\_h11=(Du2\_h10-Dw2\_h10)/(\sqrt{3}) \quad (9\text{-}1)$$

$$Dv2\_h11=(Dv2\_h10-Du2\_h10)/(\sqrt{3}) \quad (9\text{-}2)$$

$$Dw2\_h11=(Dw2\_h10-Dv2\_h10)/(\sqrt{3}) \quad (9\text{-}3)$$

The processing of S101 to S107 and the processing of S108 to S114 may be performed in the order of the processing of S108 to S114 and the processing of S101 to S107, or may be performed simultaneously in parallel.

In S115, the first upper-lower limit limitation processing values Du1_ca12, Dv1_ca12, Dw1_ca12 are corrected by the second correction amounts Du2_h11, Dv2_h11, Dw2_h11, to give first excess correction values Du1_ca13, Dv1_ca13, Dw1_ca13. The first excess correction values Du1_ca13, Dv1_ca13, Dw1_ca13 are expressed by Formulas (10-1), (10-2), (10-3), respectively.

$$Du1\_ca13=Du1\_ca12+Du2\_h11 \quad (10\text{-}1)$$

$$Dv1\_ca13=Dv1\_ca12+Dv2\_h11 \quad (10\text{-}2)$$

$$Dw1\_ca13=Dw1\_ca12+Dw2\_h11 \quad (10\text{-}3)$$

In S116, the second upper-lower limit limitation processing values Du2_ca12, Dv2_ca12, Dw2_ca12 are corrected by the first correction amounts Du1_h11, Dv1_h11, Dw1_h11, to give second excess correction values Du2_ca13, Dv2_ca13, Dw2_ca13. The second excess correction values Du2_ca13, Dv2_ca13, Dw2_ca13 are expressed by Formulas (11-1), (11-2), (11-3), respectively.

$$Du2\_ca13=Du2\_ca12+Du1\_h11 \quad (11\text{-}1)$$

$$Dv2\_ca13=Dv2\_ca12+Dv1\_h11 \quad (11\text{-}2)$$

$$Dw2\_ca13=Dw2\_ca12+Dw1\_h11 \quad (11\text{-}3)$$

In the present embodiment, the excess correction values Du1_ca13, Dv1_ca13, Dw1_ca13, Du2_ca13, Dv2_ca13, Dw2_ca13 are outputted to the drive circuit 35 as the duty command values Du1, Dv1, Dw1, Du2, Dv2, Dw2.

Figure 14A:
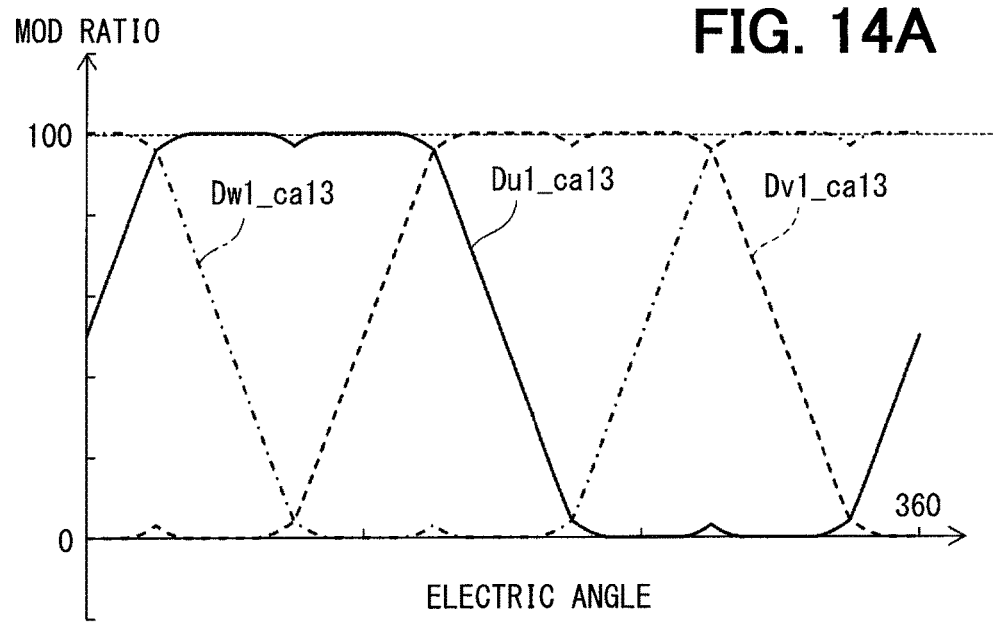
FIGS. 14A and 14B are diagrams for explaining a first excess correction value according to the first embodiment of the present disclosure.
Figure 14B:
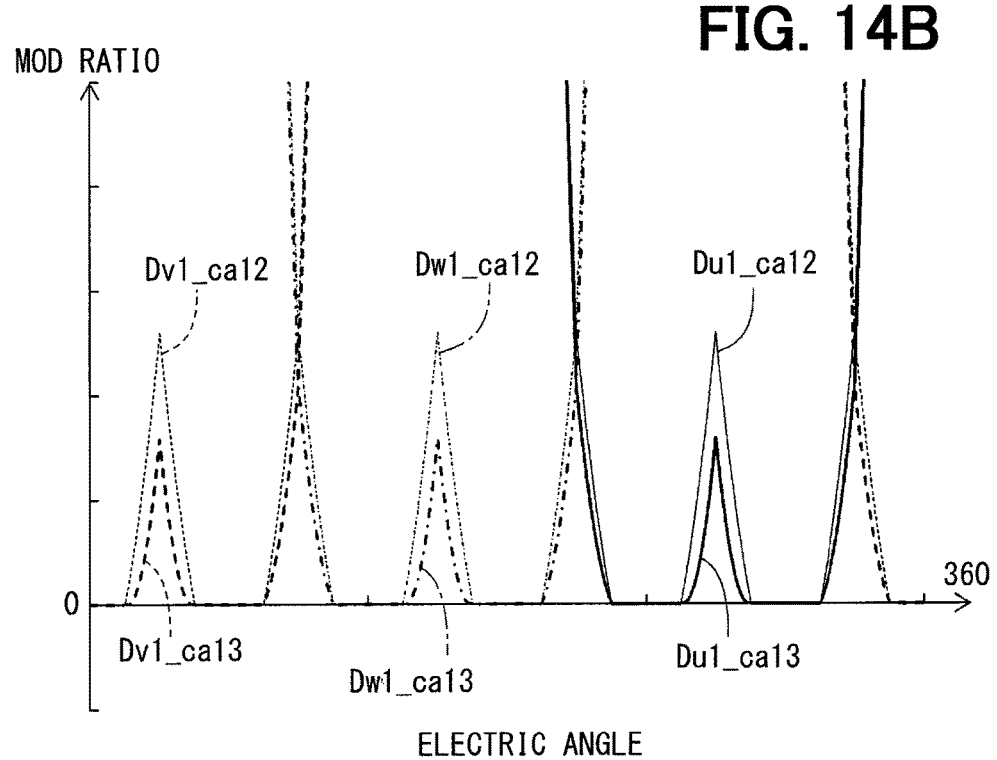
Figure 15A:
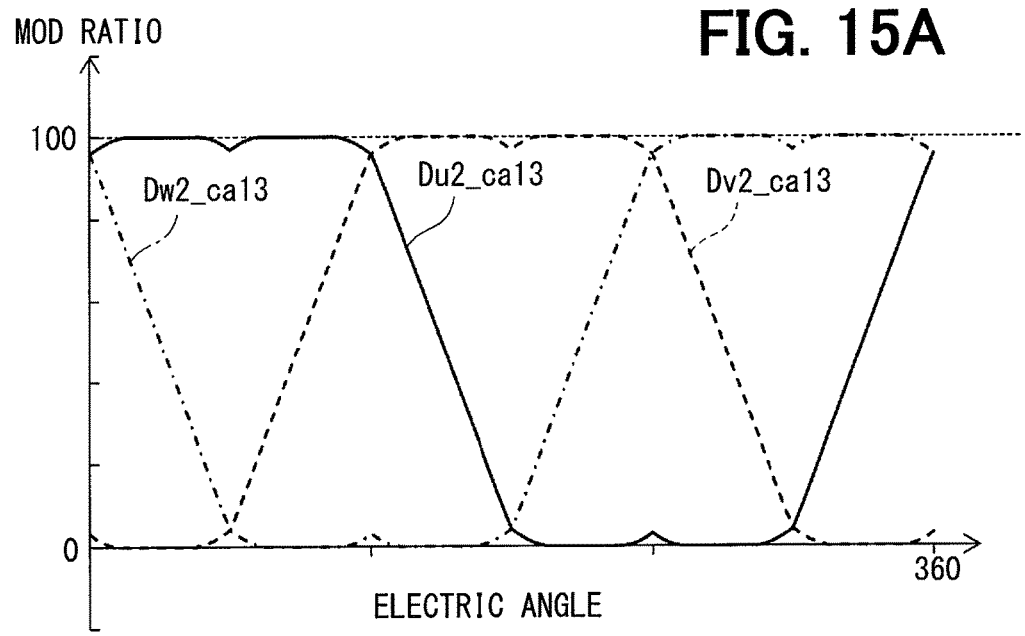
FIGS. 15A and 15B are diagrams for explaining a second excess correction value according to the first embodiment of the present disclosure.
Figure 15B:
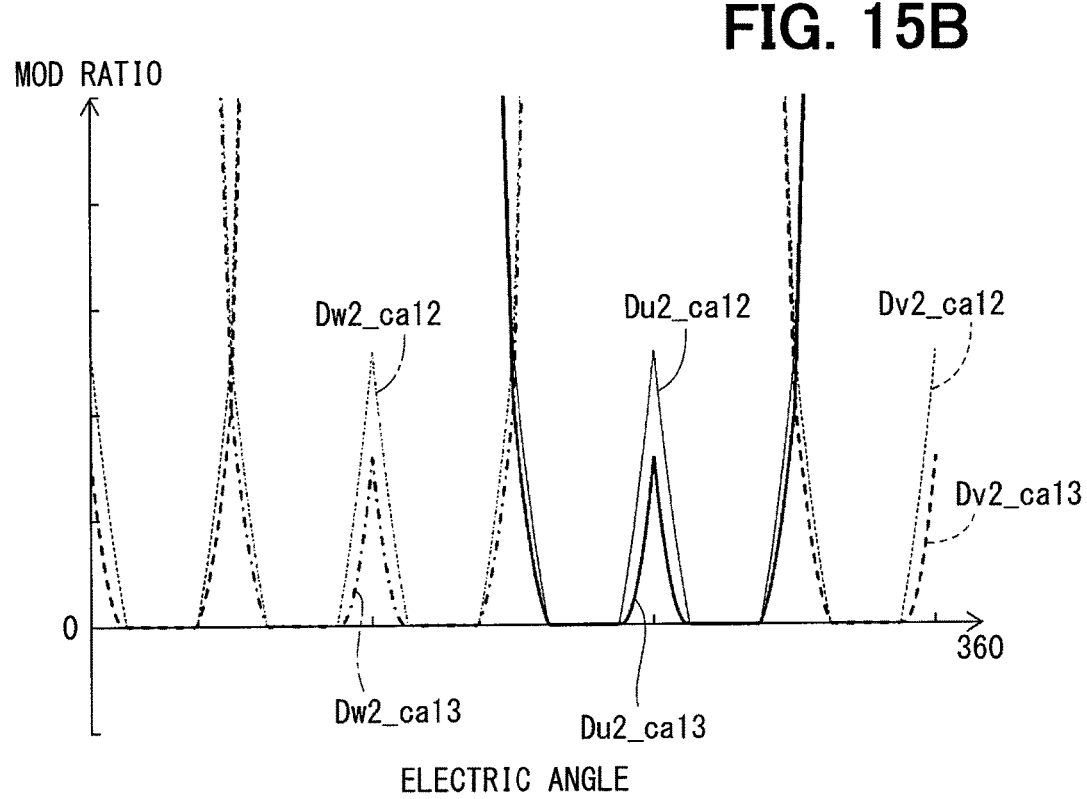

FIGS. 14A and 14B show the first excess correction values Du1_ca13, Dv1_ca13, Dw1_ca13, and FIGS. 15A and 15B show the second excess correction values Du2_ca13, Dv2_ca13, Dw2_ca13. FIG. 14A shows the whole of the first excess correction values Du1_ca13, Dv1_ca13, Dw1_ca13, and FIG. 14B shows a modulation ratio around 0[%] in an enlarged form. In FIG. 14B, thin lines indicate the first upper-lower limit limitation processing values Du1_ca12, Dv1_ca12, Dw1_ca12 before corrected by the second correction amounts Du2_h11, Dv2_h11, Dw2_h11. This also applies to FIGS. 15A and 15B.

In the present embodiment, in S104 and S111, the duty conversion values Du1_c, Dv1_c, Dw1_c, Du2_c, Dv2_c, Dw2_c are modulated to change the neutral-point voltage, whereby the neutral-point voltage obtained by the modulation is compared with the voltage before changed, thus enabling improvement in voltage utilization rate. Further, as shown in FIGS. 14A and 14B, the first excess correction values Du1_ca13, Dv1_ca13, Dw1_ca13 are values obtained by correcting the first upper-lower limit limitation processing values Du1_ca12, Dv1_ca12, Dw1_ca12 by the second correction amounts Du2_h11, Dv2_h11, Dw2_h11. The second correction amounts Du2_h11, Dv2_h11, Dw2_h11 are values calculated in the second system 102 on the basis of the second excess amounts Du2_h10, Dv2_h10, Dw2_h10 being the excess over the lower limit value RL1 or the upper limit value RH1.

Similarly, as shown in FIGS. 15A and 15B, the second excess correction values Du2_ca13, Dv2_ca13, Dw2_ca13 are values obtained by correcting the second upper-lower limit limitation processing values Du2_ca12, Dv2_ca12, Dw2_ca12 by the first correction amounts Du1_h11, Dv1_h11, Dw1_h11. The first correction amounts Du1_h11, Dv1_h11, Dw1_h11 are values calculated in the first system 101 on the basis of the first excess amounts Du1_h10, Dv1_h10, Dw1_h10 being the excess over the lower limit value RL1 or the upper limit value RH1. Hence it is possible to improve the voltage utilization rate through use of a cancel winding without increasing torque ripple. In addition, the cancel winding of the first winding set 81 is the second winding set 82, and the cancel winding of the second winding set 82 is the first winding set 81.

In the present embodiment, a voltage phase is not used in the calculation of the correction amounts Du1_h11, Dv1_h11, Dw1_h11, Du2_h11, Dv2_h11, Dw2_h11, thus eliminating the need for calculation of an arc tangent (a tan). Hence it is possible to reduce a calculation load as compared with the case of performing correction by use of a value calculated using a voltage phase such as a fifth-order higher harmonic wave, a seventh-order higher harmonic wave, or the like. Further, since the amount corresponding to the excess amount over the lower limit value or the upper limit value is corrected on the other system side, it is possible to minimize the current ripple. Moreover, differently from the case where the correction is performed on the basis of the fifth-order higher harmonic wave or the seventh-order higher harmonic wave, for example, a d-q axis converted duty in the first system 101 and a d-q axis converted duty in the second system 102 are increased or decreased by the same amount, thus preventing occurrence of an error in the process of calculating the correction amount.

As described above in detail, the power converter 1 of the present embodiment converts power of the three-phase motor 80 having the first winding set 81 and the second winding set 82, and includes the first inverter 10, the second inverter 20, and the control unit 41. The first inverter 10 is provided in correspondence with the first winding set 81. The second inverter 20 is provided in correspondence with the second winding set 82. The control unit 41 has the controller 52, the voltage limitation unit 53, the two-phase to three-phase conversion unit 54, the duty conversion unit 551, and the excess correction unit 552. The controller 52, the voltage limitation unit 53, and the two-phase to three-phase conversion unit 54 calculate the first voltage command values Vu1*, Vv1*, Vw1* related to a voltage to be applied to the first winding set 81, and the second voltage command values Vu2*, Vv2*, Vw2* related to a voltage to be applied to the second winding set 82.

The excess correction unit 552 corrects the first duty conversion values Du1_c, Dv1_c, Dw1_c and the second duty conversion values Du2_c, Dv2_c, Dw2_c that are values in accordance with the first voltage command values Vu1*, Vv1*, Vw1*. When one of the first voltage command corresponding value and the second voltage command corresponding value exceeds the lower limit value RL1 or the upper limit value RH1 which is set in accordance with a voltage that can be outputted, the excess correction unit 552 corrects the other of the first voltage command corresponding value and the second voltage command corresponding value in accordance with the excess amounts Du1_h10, Dv1_h10, Dw1_h10, Du2_h10, Dv2_h10, Dw2_h10 from the lower limit value RL1 or the upper limit value RH1.

More specifically, when the first neutral-point voltage change values Du1_ca11, Dv1_ca11, Dw1_ca11 exceed the lower limit value RL1 or the upper limit value RH1 which is set in accordance with a voltage that can be outputted, the excess correction unit 552 corrects the second upper-lower limit limitation processing values Du2_ca11, Dv2_ca12, Dw2_ca12 in accordance with the first excess amounts Du1_h10, Dv1_h10, Dw1_h10. Further, when the second neutral-point voltage change values Du2_ca11, Dv2_ca11, Dw2_ca11 exceed the lower limit value RL1 or the upper limit value RH1 which is set in accordance with a voltage that can be outputted, the excess correction unit 552 corrects the first upper-lower limit limitation processing values Du1_ca12, Dv1_ca12, Dw1_ca12 in accordance with the second excess amounts Du2_h10, Dv2_h10, Dw2_h10. In the present embodiment, when the voltage command corresponding value of one system exceeds the lower limit value RL1 or the upper limit value RH1 which is set in accordance with a voltage that can be outputted, the excess is compensated in the other system. Hence, it is possible to improve the voltage utilization rate while minimizing the current ripple.

The excess correction unit 552 performs the excess correction process on the neutral-point voltage change values Du1_ca11, Dv1_ca11, Dw1_ca11, Du2_ca11, Dv2_ca11, Dw2_ca11 obtained by changing the neutral-point voltage. Changing the neutral-point voltage can lead to further improvement in voltage utilization rate.

The power converter 1 further includes the current detection units 17, 27 for detecting a current that is allowed to pass through each phase of the first winding set 81 and the second winding set 82. Further, the first voltage command values Vu1*, Vv1*, Vw1* and the second voltage command values Vu2*, Vv2*, Vw2* are calculated on the basis of the current detection values Iu1, Iv1, Iw1, Iu2, Iv2, Iw2 detected by the current detection units 17, 27. This enables appropriate calculation of the voltage command values Vu1*, Vv1*, Vw1*, Vu2*, Vv2*, Vw2* by current feedback control.

The first voltage command values Vu1*, Vv1*, Vw1* and the second voltage command values Vu2*, Vv2*, Vw2* are values limited by the predetermined amplitude limitation value V_lim so as to be values that can be corrected in accordance with the excess amounts Du1_h10, Dv1_h10, Dw1_h10, Du2_h10, Dv2_h10, Dw2_h10. Hence, it is possible to appropriately perform the excess correction process.

The motor 80 is used for the electric power steering device 5 and assists, by output torque, the steering of the steering wheel 91 by the driver. In the power converter 1 of the present embodiment, since the torque ripple is reduced, sound and vibration generated in the electric power steering device 5 can be reduced.

In the present embodiment, the controller 52, the voltage limitation unit 53, and the two-phase to three-phase conversion unit 54 correspond to the "command calculation unit", and the lower limit value RL1 and the upper limit value RH2 correspond to the "limitation value." Further, in the present embodiment, the first neutral-point voltage change values Du1_ca11, Dv1_ca11, Dw1_ca11 correspond to the "first voltage command corresponding value", and the second neutral-point voltage change values Du2_ca11, Dv2_ca11, Dw2_ca11 correspond to the "second voltage command corresponding value." Moreover, correcting the first upper-lower limit limitation processing values Du1_ca12, Dv1_ca12, Dw1_ca12 that limit the upper and lower limits of the first neutral-point voltage change values Du1_ca11, Dv1_ca11, Dw1_ca11 and correcting the second upper-lower limit limitation processing values Du2_ca11, Dv2_ca12, Dw2_ca12 that limit the upper and lower limits of the second neutral-point voltage change values Du2_ca11, Dv2_ca11, Dw2_ca11 are assumed to be included in the concept of "correcting the other of the first voltage command corresponding value and the second voltage command corresponding value."

Second Embodiment

Figure 16:
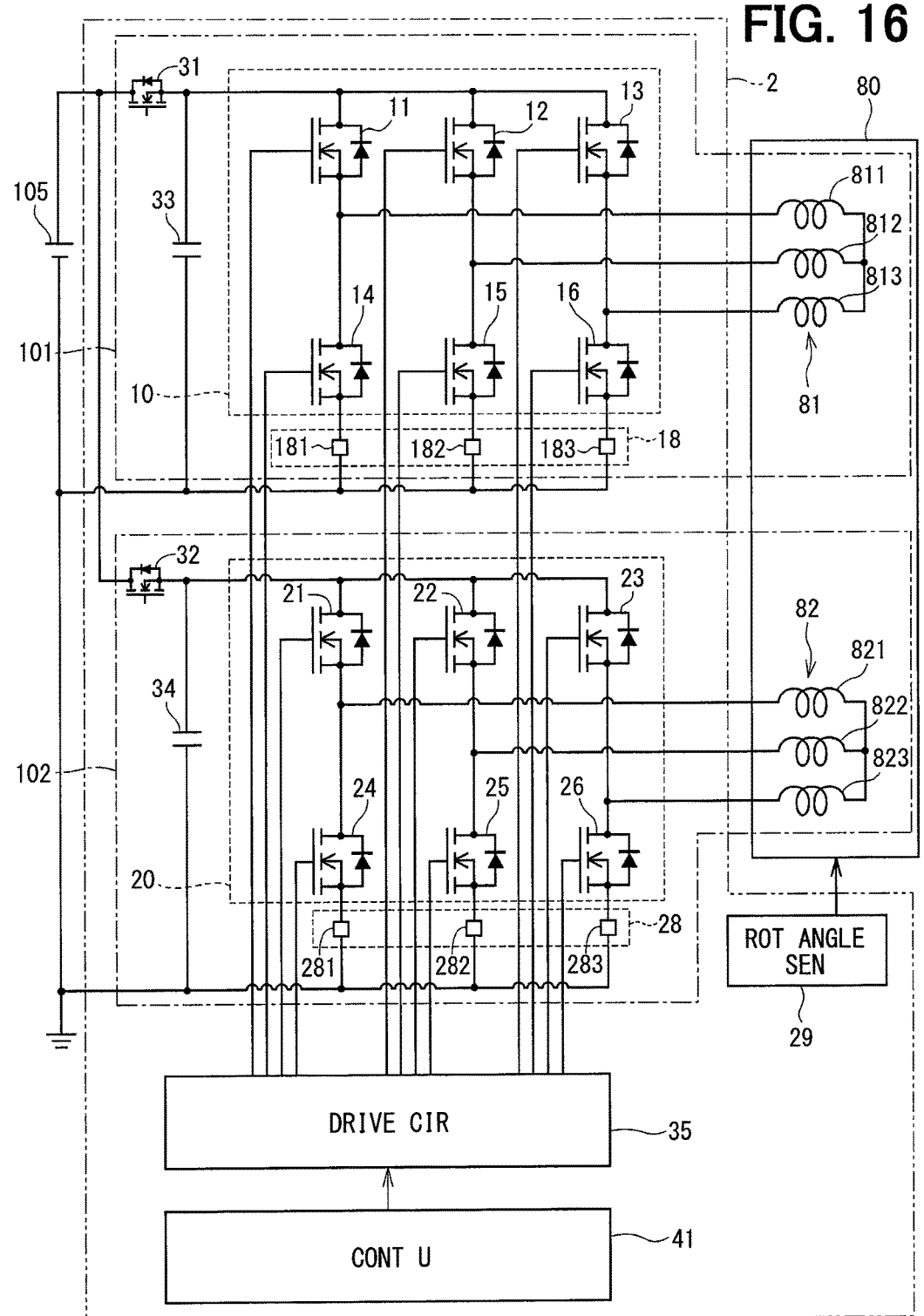
FIG. 16 is a circuit diagram for explaining an electric configuration of a power converter according to a second embodiment of the present disclosure.

FIGS. 16 to 30 show a second embodiment of the present disclosure. As shown in FIG. 16, a power converter 2 of the present embodiment are different from the power converter 1 in the first embodiment in that current detection units 18, 28 are provided in place of the current detection units 17, 27. The first current detection unit 18 has current detection elements 181, 182, 183. The U1 current detection element 181 is provided between the U-phase SW element 14 and the ground, and detects a current in the U1 coil 811. The V1 current detection element 182 is provided between the V-phase SW element 15 and the ground, and detects a current in the V1 coil 812. The W1 current detection element 183 is provided between the W-phase SW element 16 and the ground, and detects a current in the W1 coil 813.

The second current detection unit 28 has current detection elements 281, 282, 283. The U2 current detection element 281 is provided between the U-phase SW element 24 and the ground, and detects a current in the U2 coil 821. The V2 current detection element 282 is provided between the V-phase SW element 25 and the ground, and detects a current in the V2 coil 822. The W2 current detection element 283 is provided between the W-phase SW element 26 and the ground, and detects a current in the W2 coil 823. The current detection elements 181 to 183, 281 to 283 of the present embodiment are shunt resistors.

With the current detection elements 181 to 183 provided between the SW elements 14 to 16 and the ground, when the SW elements 14 to 16 are off, a current is not allowed to flow in the current detection elements 181 to 183, and hence the current cannot be detected. This makes it necessary to perform the current detection in a state where the all phases or two phase of the SW elements 14 to 16 are on. When the current detection is performed in the state where the two phases of the SW elements 14 to 16 are on, a current in the phase being off can be calculated by use of current detection values of the two phases being on. This also applies to the current detection in the second current detection unit 28.

In the present embodiment, assuming the power supply voltage Vb is 12[V] and the duty maximum value Dmax is 100.2[%], the amplitude limitation value V_lim at d-q axis coordinates related to voltage limitation in the voltage limitation unit 53 is about 8.50[V] (see Formula (1-2)). The duty maximum value Dmax is a value previously set off line, similarly to the first embodiment. In the case of not performing the excess correction process, when on-periods of the SW elements 14 to 16, 24 to 26 required for the current detection are considered, the amplitude limitation value V_lim is about 8.32[V] since the maximum value of the line voltage is 98[%] in duty conversion.

Figure 17:
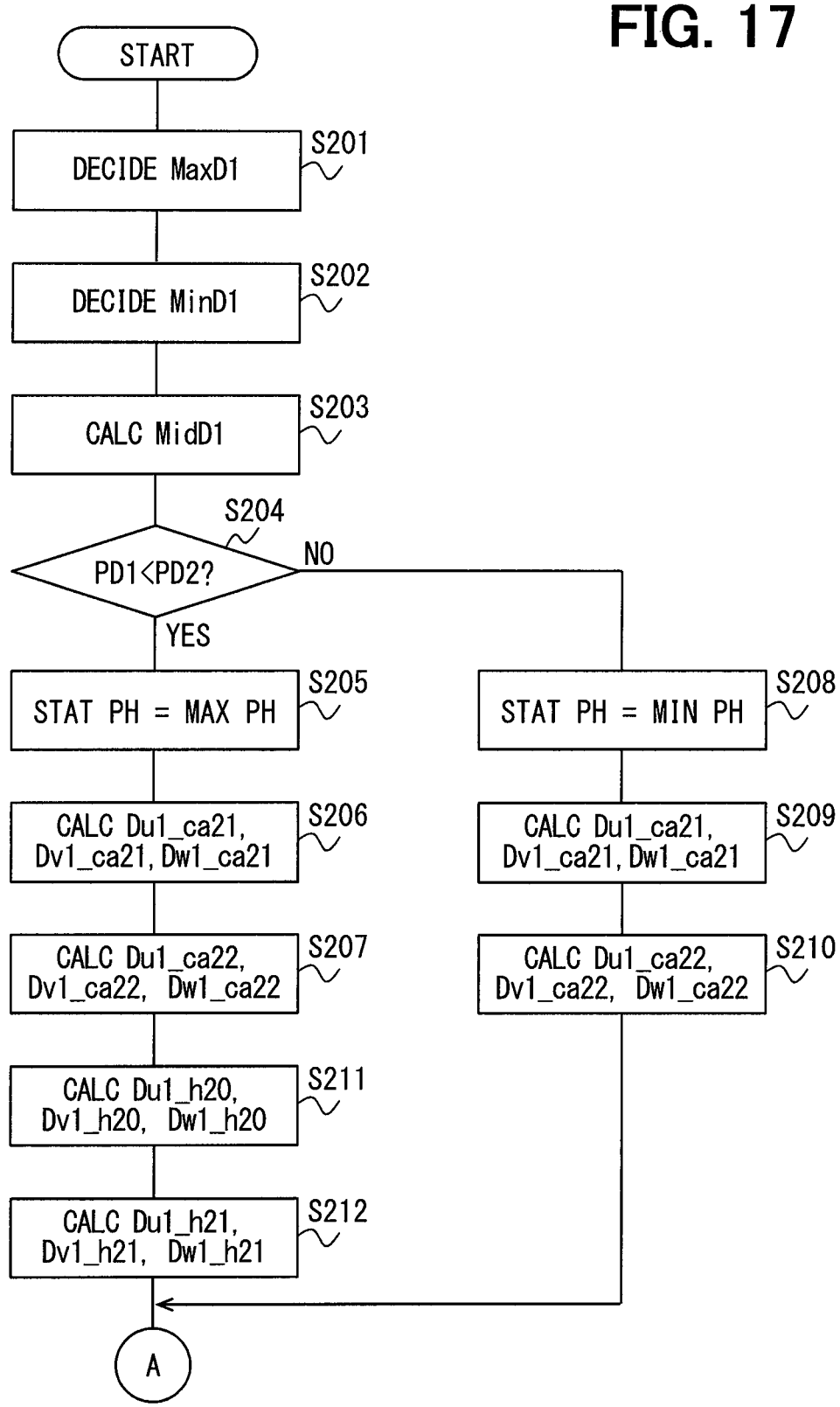
FIG. 17 is a flowchart for explaining an excess correction process according to the second embodiment of the present disclosure.

Further, the second embodiment is different from the first embodiment in the excess correction process performed by the excess correction unit 552. Hereinafter, a modulation method for performing modulation such that a duty of the smallest phase has a predetermined lower limit value is referred to as "flatbed modulation", and a modulation method for performing modulation such that a duty of the largest phase has a predetermined upper limit value is referred to as "flattop modulation." The excess correction process of the present embodiment will be described with reference to flowcharts shown in FIGS. 17 and 18. The processing of S201 to S203 in FIG. 17 is similar to the processing of S101 to S103 in FIG. 5.

In S204, the excess correction unit 552 compares a lower all-phase-on duty PD1 with a lower two-phase-on duty PD2, the duty PD1 corresponding to an all-phase-on period P1 that is a period in which all phases of the SW elements 14 to 16 are turned on at the time of the flatbed modulation, the duty PD2 corresponding to a two-phase-on period P2 that is a period in which two phases of the SW elements 14 to 16 are turned on. The lower all-phase-on duty PD1 and the lower two-phase-on duty PD2 are expressed by Formulas (12-1), (12-2), respectively.

$$PD1=100-(MaxD1-MinD1) \quad (12\text{-}1)$$

$$PD2=MaxD1-MidD1 \quad (12\text{-}2)$$

When the lower all-phase-on duty PD1 is compared with the lower two-phase-on duty PD2 and the lower all-phase-on duty PD1 is not smaller than the lower two-phase-on duty PD2, the all-phase-on period P1 is not shorter than the two-phase-on period P2. Hence, it is assumed that the current is detected when all phases of the SW elements 14 to 16 are on as the flatbed modulation. Further, when the lower two-phase-on duty PD2 is larger than the lower all-phase-on duty PD1, the two-phase-on period P2 is longer than the all-phase-on period P1. Hence it is assumed that the current is detected when two phases of the SW elements 14 to 16 are on as the flattop modulation.

When the lower all-phase-on duty PD1 is determined to be not smaller than the lower two-phase-on duty PD2 (S204: NO), the process proceeds to S208. When the lower two-phase-on duty PD2 is determined to be larger than the lower all-phase-on duty PD1 (S204: YES), the process proceeds to S205.

In S205, the excess correction unit 552 takes a stationary phase in the first system 101 as the maximum phase. When the lower two-phase-on duty PD2 is larger than the lower all-phase-on duty PD1, the neutral-point voltage is changed by the flattop modulation.

In S206, the excess correction unit 552 calculates first neutral-point voltage change values Du1_ca21, Dv1_ca21, Dw1_ca21 at the time of the flattop modulation. The neutral-point voltage change values Du1_ca21, Dv1_ca21, Dw1_ca21 at the time of the flattop modulation are expressed by Formulas (13-1), (13-2), (13-3), respectively.

$$Du1\_ca21=Du1\_c-MaxD1+RH2 \quad (13\text{-}1)$$

$$Dv1\_ca21=Dv1\_c-MaxD1+RH2 \quad (13\text{-}2)$$

$$Dw1\_ca21=Dw1\_c-MaxD1+RH2 \quad (13\text{-}3)$$

In S207, the excess correction unit 552 limits the first neutral-point voltage change values Du1_ca21, Dv1_ca21, Dw1_ca21 at the time of the flattop modulation so as to be within the range of a predetermined lower limit value RL2 to a predetermined upper limit value RH2, and calculates first upper-lower limit limitation processing values Du1_ca22, Dv1_ca22, Dw1_ca22 at the time of the flattop modulation. A detail of the upper-lower limit limitation processing is similar to that of S105.

The lower limit value RL2 and the upper limit value RH2 are arbitrarily settable. In the present embodiment, the lower limit value RL2 is set to 2[%] with the dead time taken into account. Further, the upper limit value RH2 is set to 100[%] since it is assumed here that the current detection is performed at the timing when the two phases of the SW elements 14 to 16 are on.

In S208 in which the process proceeds when the lower all-phase-on duty PD1 is determined to be not smaller than the lower two-phase-on duty PD2 (S204: NO), the excess correction unit 552 takes the stationary phase in the first system 101 as the minimum phase. When the lower all-phase-on duty PD1 is larger than the lower two-phase-on duty PD2, the neutral-point voltage is changed by the flatbed modulation.

Figure 19:
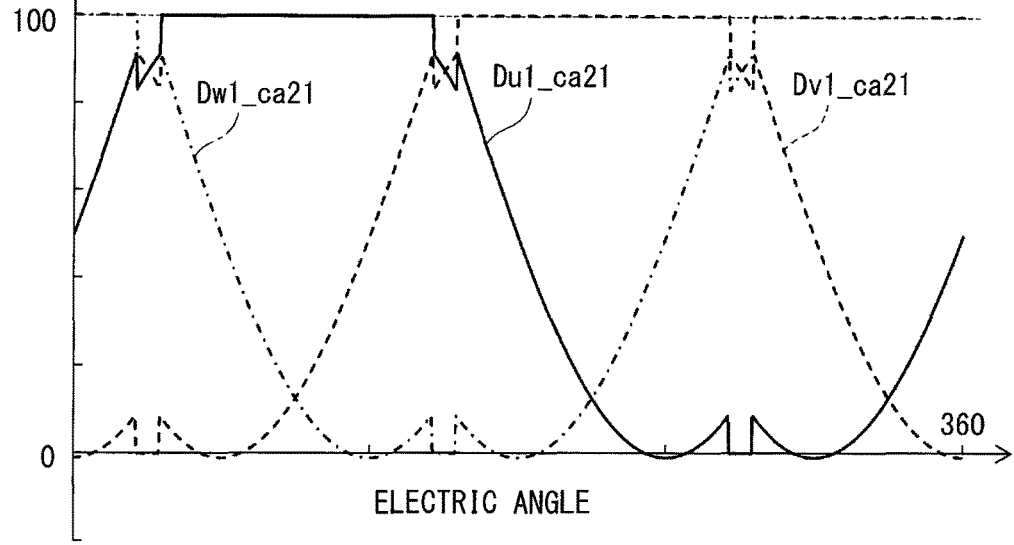
FIG. 19 is a diagram for explaining a first neutral-point voltage change value according to the second embodiment of the present disclosure.

In S209, the excess correction unit 552 calculates the first neutral-point voltage change values Du1_ca21, Dv1_ca21, Dw1_ca21 at the time of the flatbed modulation. The first neutral-point voltage change values Du1_ca21, Dv1_ca21, Dw1_ca21 at the time of the flatbed modulation are expressed by Formulas (14-1), (14-2), (14-3), respectively. The first neutral-point voltage change values Du1_ca21, Dv1_ca21, Dw1_ca21 calculated in S206 or S209 are as shown in FIG. 19.

$$Du1\_ca21=Du1\_c-MinD1+RL3 \quad (14\text{-}1)$$

$$Dv1\_ca21=Dv1\_c-MinD1+RL3 \quad (14\text{-}2)$$

$$Dw1\_ca21=Dw1\_c-MinD1+RL3 \quad (14\text{-}3)$$

In S210, the excess correction unit 552 limits the first neutral-point voltage change values Du1_ca21, Dv1_ca21, Dw1_ca21 at the time of the flatbed modulation so as to be within the range of a predetermined lower limit value RL3 to a predetermined upper limit value RH3, and calculates first upper-lower limit limitation processing values Du1_ca22, Dv1_ca22, Dw1_ca22 at the time of the flatbed modulation.

Figure 20:
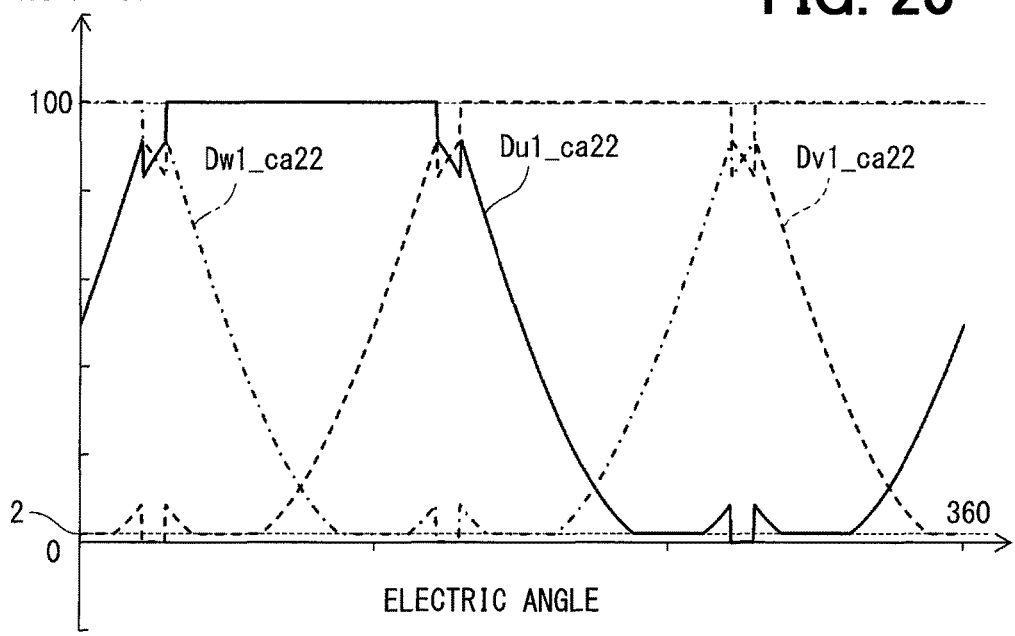
FIG. 20 is a diagram for explaining a first upper-lower limit limitation processing value according to the second embodiment of the present disclosure.

The lower limit value RL3 and the upper limit value RH3 are arbitrarily settable. In the present embodiment, the lower limit value RL3 is set to 0[%]. Further, since the current detection is performed at the timing when all phases of the SW elements 14 to 16 are on, the upper limit value RH3 is set to 93[%] in consideration of the time required for turning on all phases of the SW elements 14 to 16 and converging the ringing of currents in the current detection elements 181 to 183, and the like. The first upper-lower limit limitation processing values Du1_ca22, Dv1_ca22, Dw1_ca22 calculated in S207 or S210 are as shown in FIG. 20.

In S211 to which the process proceeds from S207, the excess correction unit 552 calculates first excess amounts Du1_h20, Dv1_h20, Dw1_h20. The first excess amounts Du1_h20, Dv1_h20, Dw1_h20 are amounts by which the first neutral-point voltage change values Du1_ca21, Dv1_ca21, Dw1_ca21 exceed the lower limit value RL2 or the upper limit value RH2, and are expressed by Formulas (15-1), (15-2), (15-3), respectively.

$$Du1\_h20=Du1\_ca21-Du1\_ca22 \quad (15\text{-}1)$$

$$Dv1\_h20=Dv1\_ca21-Dv1\_ca22 \quad (15\text{-}2)$$

$$Dw1\_h20=Dw1\_ca21-Du1\_ca22 \quad (15\text{-}3)$$

In S212, the excess correction unit 552 calculates first phase conversion amounts Du1_h21, Dv1_h21, Dw1_h21 that are values obtained by converting the first excess amounts Du1_h20, Dv1_h20, Dw1_h20 to the coordinate system of the second system 102 by use of a rotation matrix. The first phase conversion amounts Du1_h21, Dv1_h21, Dw1_h21 can be calculated by performing the dq conversion on the first excess amounts Du1_h20, Dv1_h20, Dw1_h20 in the coordinate system of the first system 101, and performing the reverse dq conversion on the dq conversion values in the coordinate system of the second system 102. The first phase conversion amounts Du1_$h21$, Dv1_$h21$, Dw1_$h21$ are expressed by Formulas (16-1), (16-2), (16-3), respectively.

$$Du1\_h21=(Du1\_h20-Dv1\_h20)/(\sqrt{3}) \quad (16\text{-}1)$$

$$Dv1\_h21=(Dv1\_h20-Dw1\_h20)/(\sqrt{3}) \quad (16\text{-}2)$$

$$Dw1\_h21=(Dw1\_h20-Du1\_h20)/(\sqrt{3}) \quad (16\text{-}3)$$

Figure 21:
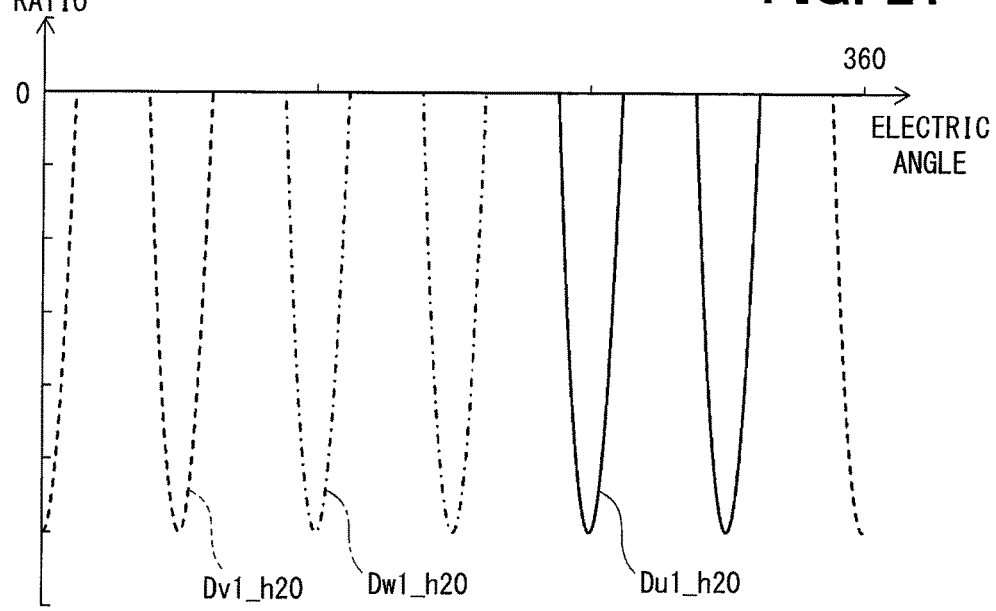
FIG. 21 is a diagram for explaining a first excess amount according to the second embodiment of the present disclosure.
Figure 22:
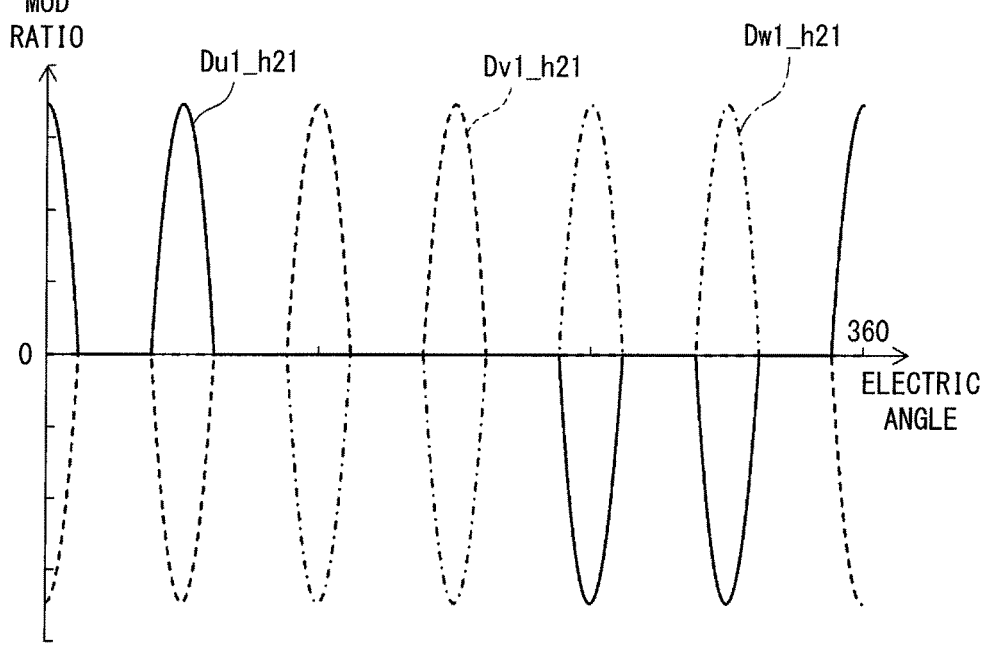
FIG. 22 is a diagram for explaining a first phase conversion amount according to the second embodiment of the present disclosure.

The first excess amounts Du1_$h20$, Dv1_$h20$, Dw1_$h20$ are 0 at the time of the flatbed modulation in calculation. Accordingly, the calculation of the first excess amounts Du1_$h20$, Dv1_$h20$, Dw1_$h20$ and the calculation of the first phase conversion amounts Du1_$h21$, Dv1_$h21$, Dw1_$h21$ are omitted. Although the process proceeds from S210 to S213 in the present embodiment, similarly to the time of the flattop modulation, the first excess amounts Du1_$h20$, Dv1_$h20$, Dw1_$h20$ and the first phase conversion amounts Du1_$h21$, Dv1_$h21$, Dw1_$h21$ may be calculated. The first excess amounts Du1_$h20$, Dv1_$h20$, Dw1_$h20$ are as shown in FIG. 21, and the first phase conversion amounts Du1_$h21$, Dv1_$h21$, Dw1_$h21$ are as shown in FIG. 22.

Figure 5:
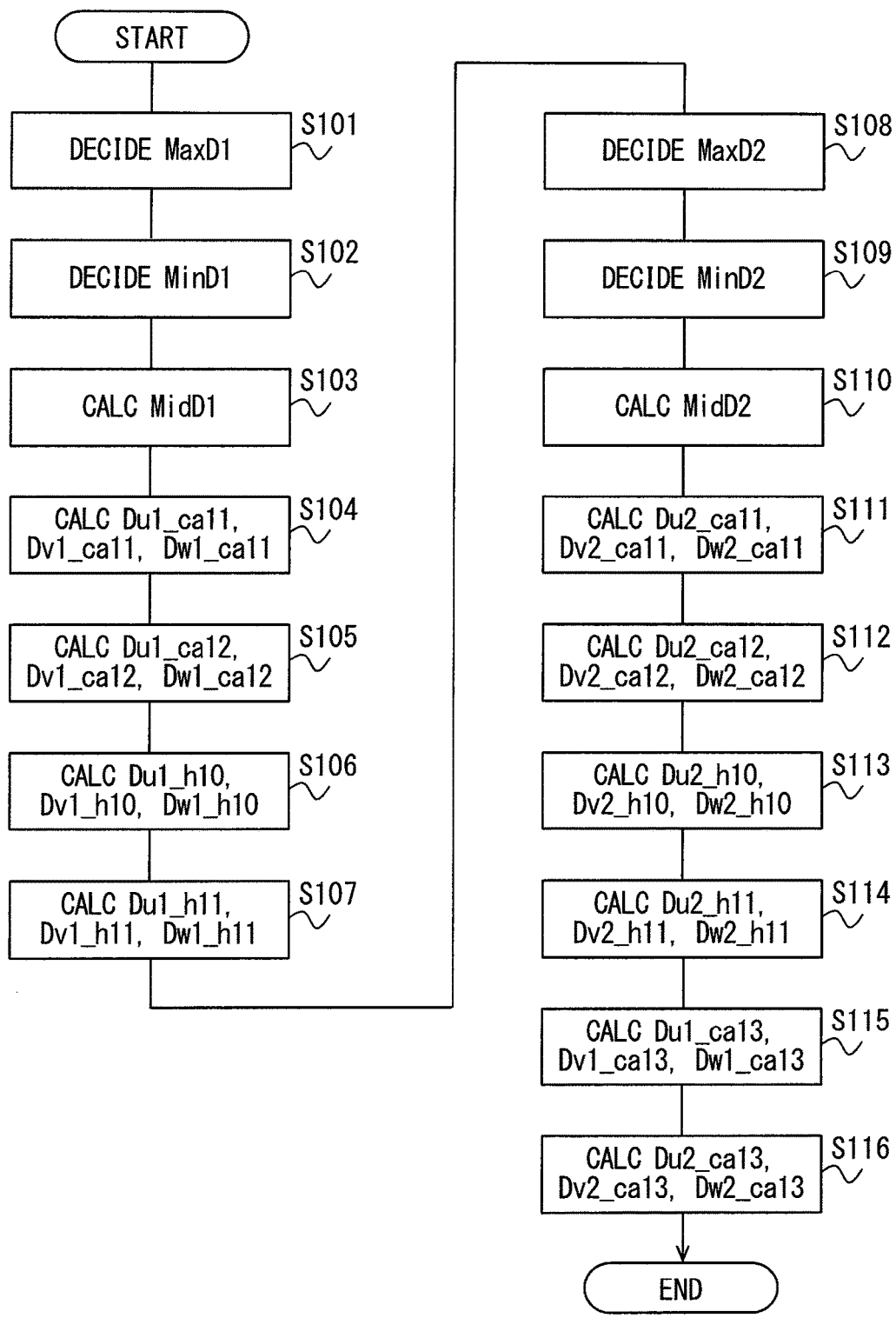
FIG. 5 is a flowchart for explaining an excess correction process according to the first embodiment of the present disclosure.
Figure 18:
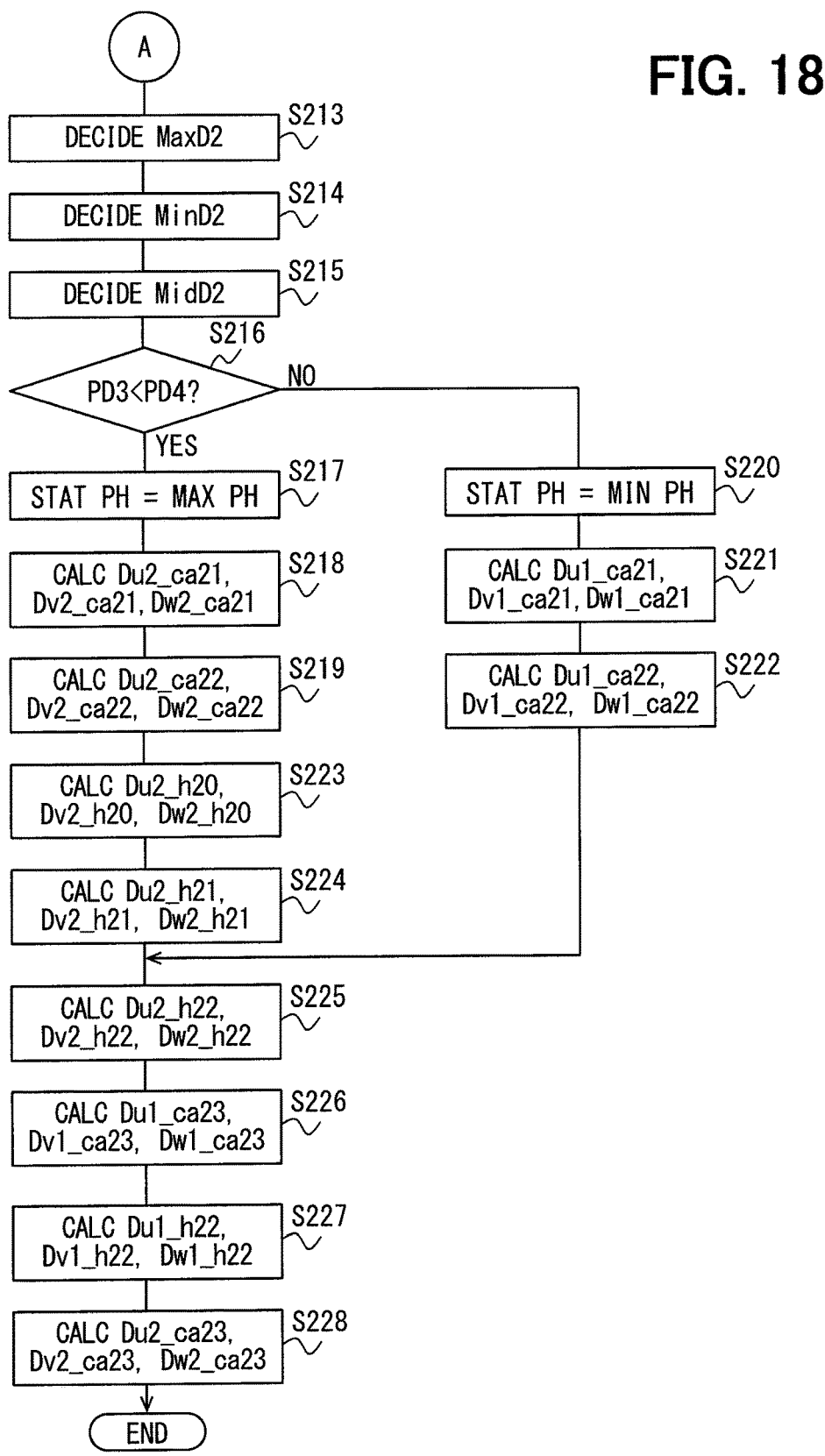
FIG. 18 is a flowchart for explaining the excess correction process according to the second embodiment of the present disclosure.

As shown in FIG. 18, the processing of S213 to S215, to which the process proceeds from S210 or S212, is similar to the processing of S108 to S110 in FIG. 5. In S216, the excess correction unit 552 compares a lower all-phase-on duty PD3 with a lower two-phase-on duty PD4, the duty PD3 corresponding to an all-phase-on period P3 that is a period in which all phases of the SW elements 24 to 26 are turned on at the time of the flatbed modulation, the duty PD4 corresponding to a two-phase-on period P4 that is a period in which two phases of the SW elements 24 to 26 are turned on. The lower all-phase-on duty PD3 and the lower two-phase-on duty PD4 are expressed by Formulas (17-1), (17-2), respectively.

$$PD3=100-(\text{Max}D2-\text{Min}D2) \quad (17\text{-}1)$$

$$PD4=\text{Max}D2-\text{Mid}D2 \quad (17\text{-}2)$$

Similarly to S204, when the lower all-phase-on duty PD3 is compared with the lower two-phase-on duty PD4 and the lower all-phase-on duty PD3 is not smaller than the lower two-phase-on duty PD4, the all-phase-on period P3 is not shorter than the two-phase-on period P4. Hence, it is assumed that the current is detected when all phases of the SW elements 24 to 26 are on as the flatbed modulation. Further, when the lower two-phase-on duty PD4 is larger than the lower all-phase-on duty PD3, the two-phase-on period P4 is longer than the all-phase-on period P3. Hence, it is assumed that the current is detected when two phases of the SW elements 24 to 26 are on as the flattop modulation.

When the lower all-phase-on duty PD3 is determined to be not smaller than the lower two-phase-on duty PD4 (S216: NO), the process proceeds to S220. When the lower two-phase-on duty PD4 is determined to be larger than the lower all-phase-on duty PD3 (S216: YES), the process proceeds to S217.

Hereinafter, detailed description of the processing of S217 to S224 is appropriately omitted since being substantially similar to the processing of S205 to S212. In S217, the excess correction unit 552 takes a stationary phase in the second system 102 as the maximum phase. When the lower two-phase-on duty PD4 is larger than the lower all-phase-on duty PD3, the neutral-point voltage is changed by the flattop modulation.

In S218, the excess correction unit 552 calculates second neutral-point voltage change values Du2_$ca21$, Dv2_$ca21$, Dw2_$ca21$ at the time of the flattop modulation. The second neutral-point voltage change values Du2_$ca21$, Dv2_$ca21$, Dw2_$ca21$ at the time of the flattop modulation are expressed by Formulas (18-1), (18-2), (18-3), respectively.

$$Du2\_ca21=Du2-\text{Max}D2+RH2 \quad (18\text{-}1)$$

$$Dv2\_ca21=Dv2-\text{Max}D2+RH2 \quad (18\text{-}2)$$

$$Dw2\_ca21=Dw2-\text{Max}D2+RH2 \quad (18\text{-}3)$$

In S219, the excess correction unit 552 limits the second neutral-point voltage change values Du2_$ca21$, Dv2_$ca21$, Dw2_$ca21$ at the time of the flattop modulation so as to be within the range of the predetermined lower limit value RL2 to the predetermined upper limit value RH2, and calculates second upper-lower limit limitation processing values Du2_$ca22$, Dv2_$ca22$, Dw2_$ca22$ at the time of the flattop modulation.

In S220 to which the process proceeds when the lower all-phase-on duty PD3 is determined to be not smaller than the lower two-phase-on duty PD4 (S216: NO), the excess correction unit 552 takes the stationary phase in the second system 102 as the minimum phase. When the lower all-phase-on duty PD3 is not smaller than the lower two-phase-on duty PD4, the neutral-point voltage is changed by the flatbed modulation.

In S221, the excess correction unit 552 calculates second neutral-point voltage change values Du2_$ca21$, Dv2_$ca21$, Dw2_$ca21$ at the time of the flatbed modulation. The second neutral-point voltage change values Du2_$ca21$, Dv2_$ca21$, Dw2_$ca21$ at the time of the flatbed modulation are expressed by Formulas (19-1), (19-2), (19-3), respectively. The second neutral-point voltage change values Du2_$ca21$, Dv2_$ca21$, Dw2_$ca21$ calculated in S217 or S220 are as shown in FIG. 23.

$$Du2\_ca21=Du2\_c-\text{Min}D2+RL3 \quad (19\text{-}1)$$

$$Dv2\_ca21=Dv2\_c-\text{Min}D2+RL3 \quad (19\text{-}2)$$

$$Dw2\_ca21=Dw2\_c-\text{Min}D2+RL3 \quad (19\text{-}3)$$

In S222, the excess correction unit 552 limits the second neutral-point voltage change values Du2_$ca21$, Dv2_$ca21$, Dw2_$ca21$ at the time of the flatbed modulation so as to be within the range of the predetermined lower limit value RL3 to the predetermined upper limit value RH3, and calculates second upper-lower limit limitation processing values Du2_$ca22$, Dv2_$ca22$, Dw2_$ca22$ at the time of the flatbed modulation. The second upper-lower limit limitation processing values Du2_$ca22$, Dv2_$ca22$, Dw2_$ca22$ calculated in S219 or S222 are as shown in FIG. 24.

In S223 to which the process proceeds from S219, the excess correction unit 552 calculates second excess amounts Du2_$h20$, Dv2_$h20$, Dw2_$h20$. The second excess amounts Du2_$h20$, Dv2_$h20$, Dw2_$h20$ are amounts by which the second neutral-point voltage change values Du2_$ca21$, Dv2_$ca21$, Dw2_$ca21$ exceed the lower limit value RL2 or the upper limit value RH2, and are expressed by Formulas (20-1), (20-2), (20-3), respectively.

$$Du2\_h20=Du2\_ca21-Du2\_ca22 \quad (20\text{-}1)$$

$$Dv2\_h20=Dv2\_ca21-Dv2\_ca22 \quad (20\text{-}2)$$

$$Dw2\_h20=Dw2\_ca21-Dw2\_ca22 \quad (20\text{-}3)$$

In S224, the excess correction unit 552 calculates second phase conversion amounts Du2_$h21$, Dv2_$h21$, Dw2_$h21$ that are values obtained by converting the second excess amounts Du2_h20, Dv2_h20, Dw2_h20 to the coordinate system of the first system 101 by use of a rotation matrix. The second phase conversion amounts Du2_h21, Dv2_h21, Dw2_h21 can be calculated by performing the dq conversion on the second excess amounts Du2_h20, Dv2_h20, Dw2_h20 in the coordinate system of the second system 102, and performing the reverse dq conversion on the dq conversion values in the coordinate system of the first system 101. The second phase conversion amounts Du2_h21, Dv2_h21, Dw2_h21 are expressed by Formulas (21-1), (21-2), (21-3), respectively.

$$Du2\_h21=(Du2\_h20-Dw2\_h20)/(\sqrt{3}) \quad (21\text{-}1)$$

$$Dv2\_h21=(Dv2\_h20-Du2\_h20)/(\sqrt{3}) \quad (21\text{-}2)$$

$$Dw2\_h21=(Dw2\_h20-Dv2\_h20)/(\sqrt{3}) \quad (21\text{-}3)$$

Similarly to the first system 101, the second excess amounts Du2_h20, Dv2_h20, Dw2_h20 are 0 at the time of the flatbed modulation in calculation. Accordingly, the calculation of the second excess amounts Du2_h20, Dv2_h20, Dw2_h20 and the calculation of the second phase conversion amounts Du2_h21, Dv2_h21, Dw2_h21 are omitted. Although the process proceeds from S222 to S225 in the present embodiment, similarly to the time of the flattop modulation, the second excess amounts Du2_h20, Dv2_h20, Dw2_h20 and the second phase conversion amounts Du2_h21, Dv2_h21, Dw2_h21 may be calculated. The second excess amounts Du2_h20, Dv2_h20, Dw2_h20 are as shown in FIG. 25, and the second phase conversion amounts Du2_h21, Dv2_h21, Dw2_h21 are as shown in FIG. 26. The processing of S210 to S212 and the processing of S213 to S224 may be performed in the order of the processing of S213 to S224 and the processing of S210 to S212, or may be performed simultaneously in parallel.

In S225, the excess correction unit 552 modulates the second phase conversion amounts Du2_h21, Dv2_h21, Dw2_h21 such that the second correction amount for correcting the stationary phase is 0, and calculates second correction amounts Du2_h22, Dv2_h22, Dw2_h22.

When the stationary phase in the first system 101 is the U-phase, the second correction amounts Du2_h22, Dv2_h22, Dw2_h22 are expressed by Formulas (22-1), (22-2), (22-3), respectively.

$$Du2\_h22=0 \quad (22\text{-}1)$$

$$Dv2\_h22=Dv2\_h21-Du2\_h21 \quad (22\text{-}2)$$

$$Dw2\_h22=Dw2\_h21-Du2\_h21 \quad (22\text{-}3)$$

When the stationary phase in the first system 101 is the V-phase, the second correction amounts Du2_h22, Dv2_h22, Dw2_h22 are expressed by Formulas (23-1), (23-2), (23-3), respectively.

$$Du2\_h22=Du2\_h21-Dv2\_h21 \quad (23\text{-}1)$$

$$Dv2\_h22=0 \quad (23\text{-}2)$$

$$Dw2\_h22=Dw2\_h21-Dv2\_h21 \quad (23\text{-}3)$$

When the stationary phase in the first system 101 is the W-phase, the second correction amounts Du2_h22, Dv2_h22, Dw2_h22 are expressed by Formulas (24-1), (24-2), (24-3), respectively.

$$Du2\_h22=Du2\_h21-Dw2\_h21 \quad (24\text{-}1)$$

$$Dv2\_h22=Dv2\_h21-Dw2\_h21 \quad (24\text{-}2)$$

$$Dw2\_h22=0 \quad (24\text{-}3)$$

Figure 27:
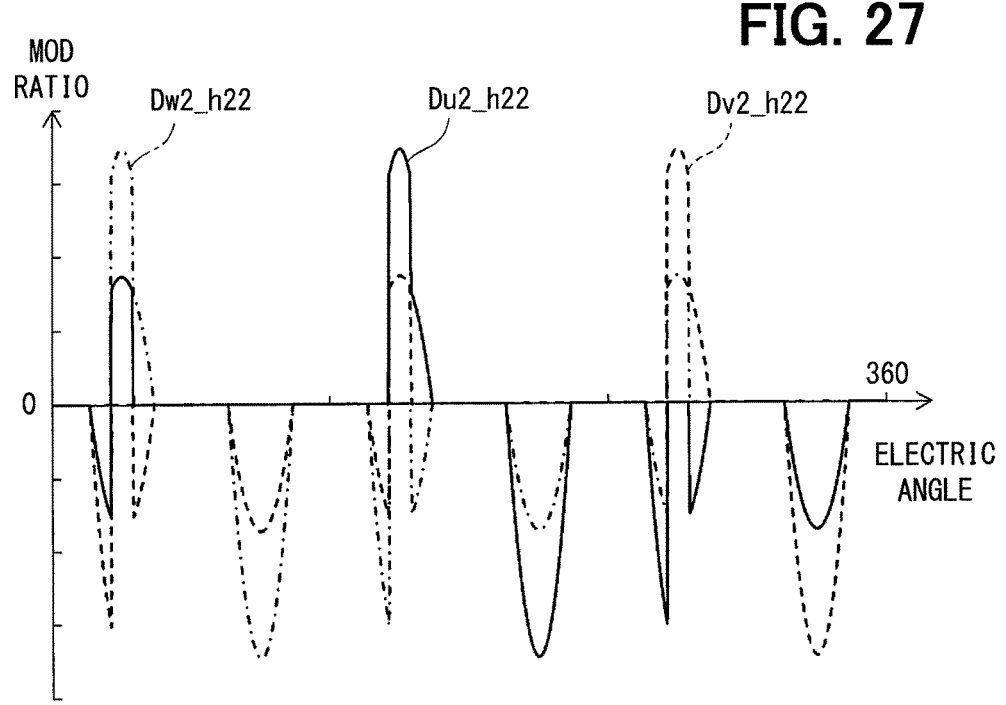
FIG. 27 is a diagram for explaining a second correction amount according to the second embodiment of the present disclosure.

The second correction amounts Du2_h22, Dv2_h22, Dw2_h22 are as shown in FIG. 27.

In S226, the excess correction unit 552 corrects the first upper-lower limit limitation processing values Du1_ca22, Dv1_ca22, Dw1_ca22 by the second correction amounts Du2_h22, Dv2_h22, Dw2_h22, to give first excess correction values Du1_ca23, Dv1_ca23, Dw1_ca23. The first excess correction values Du1_ca23, Dv1_ca23, Dw1_ca23 are expressed by Formulas (25-1), (25-2), (25-3), respectively.

$$Du1\_ca23=Du1\_ca22+Du2\_h22 \quad (25\text{-}1)$$

$$Dv1\_ca23=Dv1\_ca22+Dv2\_h22 \quad (25\text{-}2)$$

$$Dw1\_ca23=Dw1\_ca22+Dw2\_h22 \quad (25\text{-}3)$$

The first excess correction values Du1_ca23, Dv1_ca23, Dw1_ca23 are as shown in FIGS. 28A and 28B. FIG. 28A shows the whole of the first excess correction values Du1_ca23, Dv1_ca23, Dw1_ca23. FIG. 28B shows a modulation ratio around 0[%] in an enlarged form, and thin lines indicate the first upper-lower limit limitation processing values Du1_ca22, Dv1_ca22, Dw1_ca22 before corrected by the second correction amounts Du2_h22, Dv2_h22, Dw2_h22. This also applies to FIG. 30 described later.

In S227, the excess correction unit 552 modulates the phase conversion amounts Du1_h21, Du1_h21, Dw1_h21 such that the first correction amount for correcting the stationary phase is 0, and calculates first correction amounts Du1_h22, Dv1_h22, Dw1_h22.

When the stationary phase in the second system 102 is the U-phase, the first correction amounts Du1_h22, Dv1_h22, Dw1_h22 are expressed by Formulas (26-1), (26-2), (26-3), respectively.

$$Du1\_h22=0 \quad (26\text{-}1)$$

$$Dv1\_h22=Dv1\_h21-Du1\_h21 \quad (26\text{-}2)$$

$$Dw1\_h22=Dw1\_h21-Du1\_h21 \quad (26\text{-}3)$$

When the stationary phase in the second system 102 is the V-phase, the first correction amounts Du1_h22, Dv1_h22, Dw1_h22 are expressed by Formulas (27-1), (27-2), (27-3), respectively.

$$Du1\_h22=Du1\_h21-Dv1\_h21 \quad (27\text{-}1)$$

$$Dv1\_h22=0 \quad (27\text{-}2)$$

$$Dw1\_h22=Du1\_h21-Dv1\_h21 \quad (27\text{-}3)$$

When the stationary phase in the second system 102 is the W-phase, the first correction amounts Du1_h22, Dv1_h22, Dw1_h22 are expressed by Formulas (28-1), (28-2), (28-3), respectively.

$$Du1\_h22=Du1\_h21-Dw1\_h21 \quad (28\text{-}1)$$

$$Dv1\_h22=Dv1\_h21-Du1\_h21 \quad (28\text{-}2)$$

$$Dw1\_h22=0 \quad (28\text{-}3)$$

Figure 29:
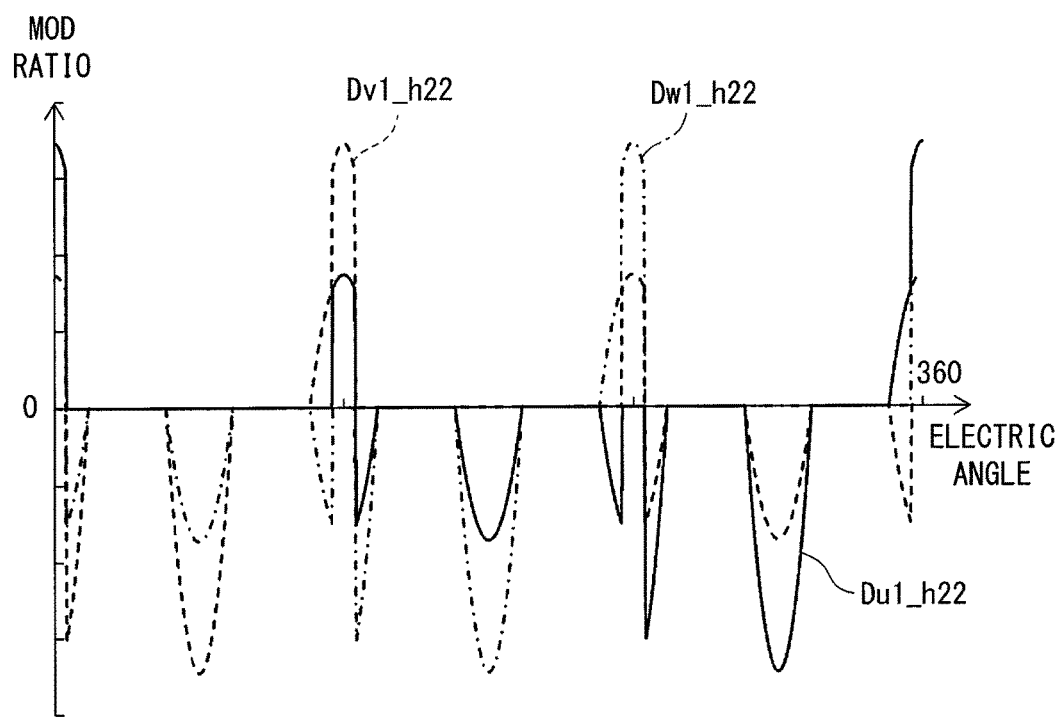
FIG. 29 is a diagram for explaining a first correction amount according to the second embodiment of the present disclosure.

The first correction amounts Du1_h22, Dv1_h22, Dw1_h22 are as shown in FIG. 29.

In S228, the excess correction unit 552 corrects the second upper-lower limit limitation processing values Du2_ca22, Dv2_ca22, Dw2_ca22 by the first correction amounts Du1_h22, Dv1_h22, Dw1_h22, to give second excess correction values Du2_ca23, Dv2_ca23, Dw2_ca23.

The second excess correction values $Du2\_ca23$, $Dv2\_ca23$, $Dw2\_ca23$ are expressed by Formulas (29-1), (29-2), (29-3), respectively.

$$Du2\_ca23 = Du2\_ca22 + Du1\_h22 \quad (29\text{-}1)$$

$$Dv2\_ca23 = Dv2\_ca22 + Dv1\_h22 \quad (29\text{-}2)$$

$$Dw2\_ca23 = Dw2\_ca22 + Dw1\_h22 \quad (29\text{-}3)$$

Figure 30A:
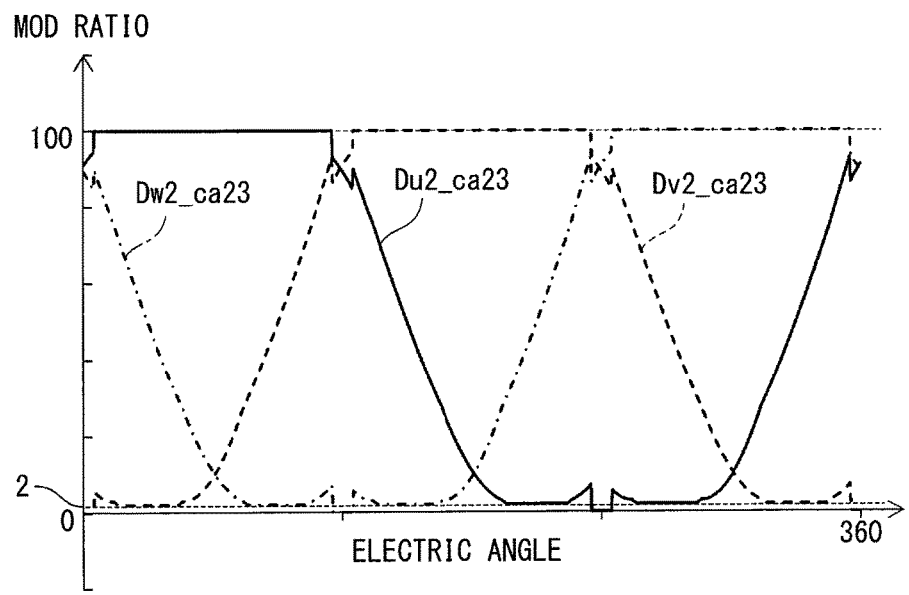
FIGS. 30A and 30B are diagrams for explaining a second excess correction value according to the second embodiment of the present disclosure.
Figure 30B:
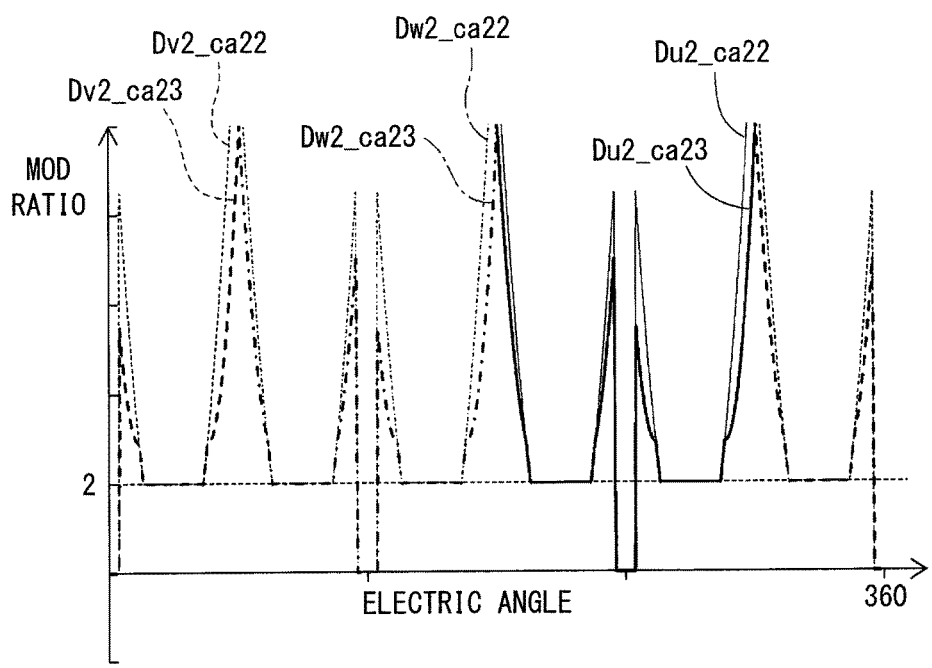

The second excess correction values $Du2\_ca23$, $Dv2\_ca23$, $Dw2\_ca23$ are as shown in FIGS. 30A and 30B.

In the present embodiment, the excess correction values $Du1\_ca23$, $Dv1\_ca23$, $Dw1\_ca23$, $Du2\_ca23$, $Dv2\_ca23$, $Dw2\_ca23$ are outputted to the drive circuit 35 as the duty command values $Du1$, $Dv1$, $Dw1$, $Du2$, $Dv2$, $Dw2$.

In the present embodiment, the first inverter 10 and the second inverter 20 have the high-potential-side SW elements 11 to 13, 21 to 23 and the low-potential-side SW elements 14 to 16, 24 to 26 which are in pair for the respective phases. The current detection units 18, 28 are provided between the low-potential-side SW elements 14 to 16, 24 to 26 and the ground. Hence, the shunt resistors can be suitably used as the current detection elements 181 to 183, 281 to 283.

The excess correction unit 552 compares the all-phase-on period P1, in which the low-potential-side SW elements 14 to 16 of three phases are on, in which the low-potential-side switching elements 14 to 16 of two phases are on, and changes the neutral-point voltage such that the current detection can be performed in the longer period. Further, the excess correction unit 552 compares the all-phase-on period P3, in which the low-potential-side SW elements 24 to 26 of three phases are on, with the two-phase-on period P4, in which the low-potential-side switching elements 24 to 26 of two phases are on, and changes the neutral-point voltage such that current detection can be performed in the longer period. Hence, it is possible to improve the voltage utilization rate while enabling the current detection by the current detection units 18, 28 provided on the low potential side. Further, a similar effect to that of the first embodiment is exerted. In the present embodiment, the lower limit values RL2, RL3 and the upper limit values RH2, RH3 correspond to the "limitation value."

Third Embodiment

Figure 31:
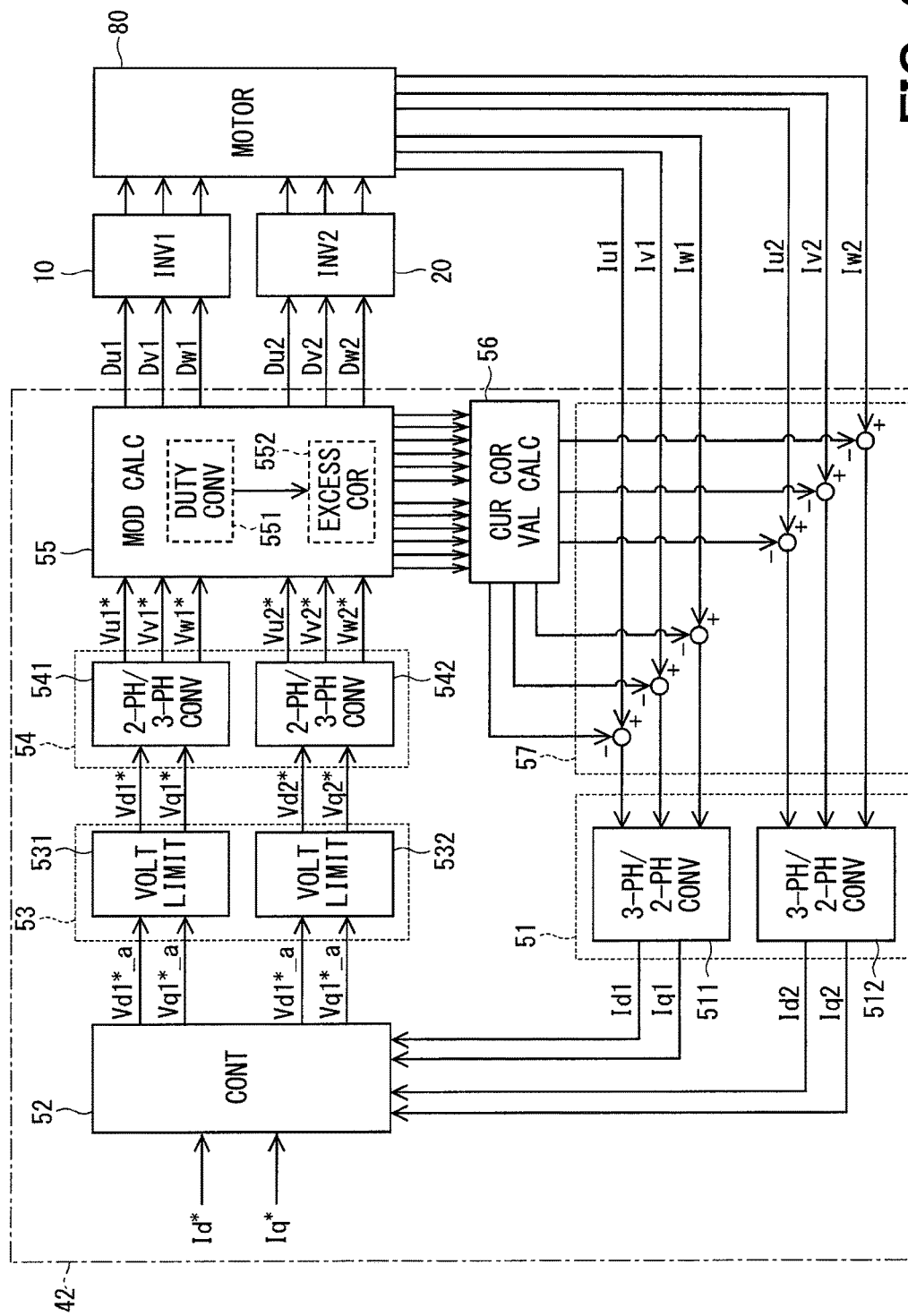
FIG. 31 is a block diagram for explaining a control unit according to a third embodiment of the present disclosure.
Figure 32:
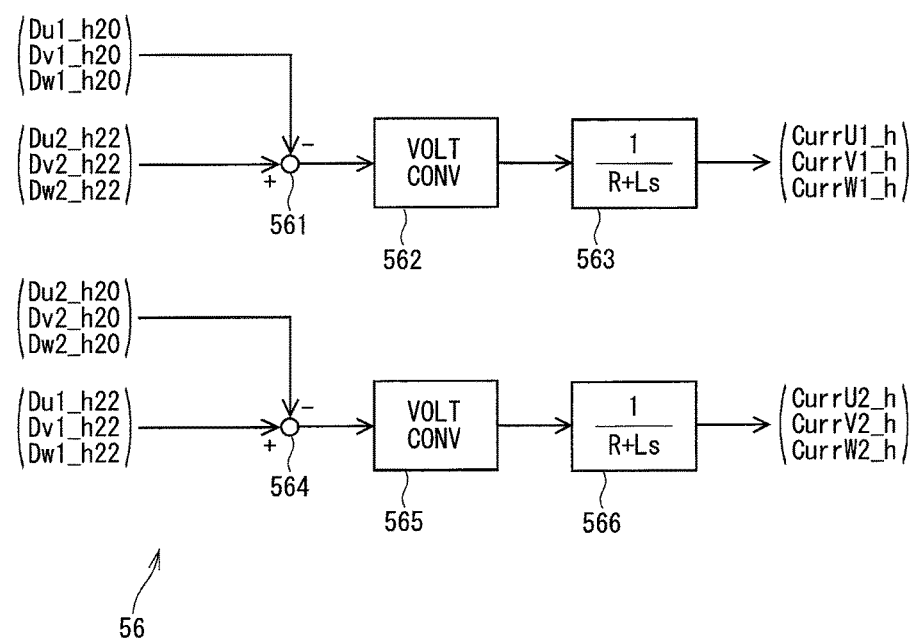
FIG. 32 is a block diagram for explaining a current correction value calculation unit according to the third embodiment of the present disclosure.

FIGS. 31 and 32 show a third embodiment of the present disclosure. As shown in FIG. 31, the control unit 42 of the third embodiment is different from those of the first and second embodiments in that the control unit 42 includes a current correction value calculation unit 56 and a current correction unit 57, in addition to the three-phase to two-phase conversion unit 51, the controller 52, the voltage limitation unit 53, the two-phase to three-phase conversion unit 54, and the modulation calculation unit 55.

In the excess correction process, in the first system 101, duties equivalent to the first excess amounts $Du1\_h20$, $Dv1\_h20$, $Dw1\_h20$ are subtracted, and duties equivalent to the second correction amounts $Du2\_h22$, $Dv2\_h22$, $Dw2\_h22$ in accordance with second excess amounts $Du2\_h20$, $Dv2\_h20$, $Dv2\_h20$ are added. Further, in the second system 102, duties equivalent to the second excess amounts $Du2\_h20$, $Dv2\_h20$, $Dw2\_h20$ are subtracted, and duties equivalent to the first correction amounts $Du1\_h22$, $Dv1\_h22$, $Dw1\_h22$ in accordance with first excess amounts $Du1\_h20$, $Dv1\_h20$, $Dv1\_h20$ are added. In the present embodiment, currents in accordance with the duties to be changed by the excess correction process are estimated to correct the current detection values $Iu1$, $Iv1$, $Iw1$, $Iu2$, $Iv2$, $Iw2$.

As shown in FIG. 32, the current correction value calculation unit 56 has subtractors 561, 564, voltage conversion units 562, 565, and current estimation units 563, 566. FIG. 32 shows an example where the calculation of the second embodiment is performed by the excess correction unit 552.

The first subtractor 561 subtracts the first excess amount $Du1\_h20$ from the U-phase second correction amount $Du2\_h22$ to calculate a first duty change value $\Delta Du1$. Similarly, the first subtractor 561 subtracts the first excess amount $Dv1\_h20$ from the V-phase second correction amount $Dv2\_h22$ to calculate a first duty change value $\Delta Dv1$, and subtracts the first excess amount $Dw1\_h20$ from the W-phase second correction amount $Dw2\_h22$ to calculate a first duty change value $\Delta Dw1$. The first duty change values $\Delta Du1$, $\Delta Dv1$, $\Delta Dw1$ can be taken as changed amounts by which the duties of the first duty conversion values $Du1\_c$, $Dv1\_c$, $Dw1\_c$ are changed by the excess correction process.

The first voltage conversion unit 562 multiplies each of the first duty change values $\Delta Du1$, $\Delta Dv1$, $\Delta Dw1$ calculated by the first subtractor 561 by (Vb/100), to calculate first voltage change values $\Delta Vu1$, $\Delta Vv1$, $\Delta Vw1$ obtained by converting the duties to voltages. The first current estimation unit 563 estimates currents in accordance with the first voltage change values $\Delta Vu1$, $\Delta Vv1$, $\Delta Vw1$, to calculate first current correction values $CurrU1\_h$, $CurrV1\_h$, $CurrW1\_h$.

The second subtractor 564 subtracts the second excess amount $Du2\_h20$ from the U-phase first correction amount $Du1\_h22$ to calculate a second duty change value $\Delta Du2$. Similarly, the second subtractor 564 subtracts the second excess amount $Dv2\_h20$ from the V-phase first correction amount $Dv1\_h22$ to calculate a second duty change value $\Delta Dv2$, and subtracts the second excess amount $Dw2\_h20$ from the W-phase first correction amount $Dw1\_h22$ to calculate a second duty change value $\Delta Dw2$. The second duty change values $\Delta Du2$, $\Delta Dv2$, $\Delta Dw2$ can be taken as changed amounts by which the duties of the second duty conversion values $Du2\_c$, $Dv2\_c$, $Dw2\_c$ are changed by the excess correction process.

The second voltage conversion unit 565 multiplies each of the second duty change values $\Delta Du2$, $\Delta Dv2$, $\Delta Dw2$ calculated by the second subtractor 564 by (Vb/100), to calculate second voltage change values $\Delta Vu2$, $\Delta Vv2$, $\Delta Vw2$ obtained by converting the duties to voltages. The second current estimation unit 566 estimates current values in accordance with the second voltage change values $\Delta Vu2$, $\Delta Vv2$, $\Delta Vw2$, to calculate second current correction values $CurrU2\_h$, $CurrV2\_h$, $CurrW2\_h$.

In addition, also in a case where the calculation of the first embodiment is to be performed in the excess correction unit 552, the first current correction values $CurrU1\_h$, $CurrV1\_h$, $CurrW1\_h$ can be calculated on the basis of the second correction amounts $Du2\_h11$, $Dv2\_h11$, $Dw2\_h11$ and the first excess amounts $Du1\_h10$, $Dv1\_h10$, $Dw1\_h10$. Further, the second current correction values $CurrU2\_h$, $CurrV2\_h$, $CurrW2\_h$ can be calculated on the basis of the first correction amounts $Du1\_h11$, $Dv1\_h11$, $Dw1\_h11$ and the second excess amounts $Du2\_h10$, $Dv2\_h10$, $Dw2\_h10$.

As shown in FIG. 31, the current correction unit 57 corrects the U1 current detection value $Iu1$ by the current correction value $CurrU1\_h$, corrects the V1 current detection value $Iv1$ by the current correction value $CurrV1\_h$, and corrects the W1 current detection value $Iw1$ by the current correction value $CurrW1\_h$. Further, the current correction unit 57 corrects the U2 current detection value Iu2 by the current correction value CurrU2_h, corrects the V2 current detection value Iv2 by the current correction value CurrV2_h, and corrects the W2 current detection value Iw2 by the current correction value CurrW2_h. In the present embodiment, respectively from the current detection values Iu1, Iv1, Iw1, Iu2, Iv2, Iw2, the corresponding current correction values CurrU1_h, CurrV1_h, CurrW1_h, CurrU2_h, CurrV2_h, CurrW2_h are subtracted. The current correction calculation in the current correction unit 57 is not restricted to subtraction, but may be any form of calculation. The three-phase to two-phase conversion unit 51 performs three-to-two phase conversion by use of the current detection values Iu1, Iv1, Iw1, Iu2, Iv2, Iw2 corrected by the current correction values CurrU1_h, CurrV1_h, CurrW1_h, CurrU2_h, CurrV2_h, CurrW2_h.

The control unit 42 further has the current correction value calculation unit 56 and the current correction unit 57. The current correction value calculation unit 56 calculates the current correction values CurrU1_h, CurrV1_h, CurrW1_h, CurrU2_h, CurrV2_h, CurrW2_h in accordance with currents generated by the excess correction process. The current correction unit 57 corrects the current detection values Iu1, Iv1, Iw1, Iu2, Iv2, Iw2 on the basis of the current correction values CurrU1_h, CurrV1_h, CurrW1_h, CurrU2_h, CurrV2_h, CurrW2_h. This enables more appropriate calculation of the voltage command values Vu1*, Vv1*, Vw1*, Vu2*, Vv2*, Vw2*. Further, similar effects to those of the above embodiments are exerted.

Fourth Embodiment

Figure 33:
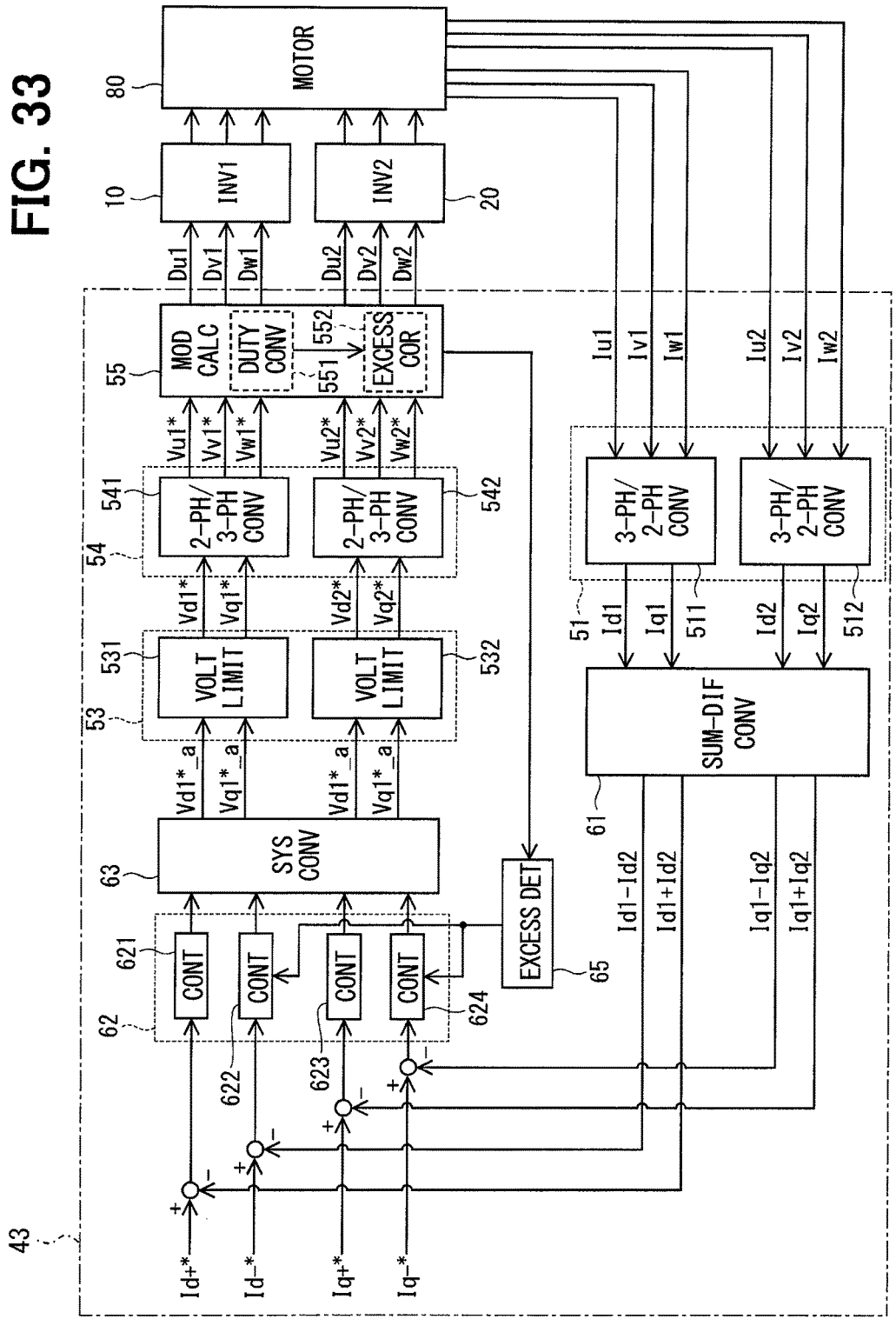
FIG. 33 is a diagram for explaining a control unit according to a fourth embodiment of the present disclosure.

FIG. 33 shows a fourth embodiment of the present disclosure. As shown in FIG. 33, a control unit 43 of the present embodiment has the three-phase to two-phase conversion unit 51, a sum-difference conversion unit 61, a controller 62, a system conversion unit 63, the voltage limitation unit 53, the two-phase to three-phase conversion unit 54, the modulation calculation unit 55, an excess determination unit 65, and the like. The sum-difference conversion unit 61 converts the d-axis current detection values Id1, Id2 and the q-axis current detection values Iq1, Iq2 to sums and differences. Specifically, the sum-difference conversion unit 61 calculates a d-axis current sum Id1+Id2, a d-axis current difference Id−Id2, a q-axis current sum Iq1+Iq2, and a q-axis current difference Iq−Iq2. As in the third embodiment, as the d-axis current detection values Id1, Id2 and the q-axis current detection values Iq1, Iq2, there may be used values on the basis of the current detection values Iu1, Iv1, Iw1, Iu2, Iv2, Iw2 corrected by the current correction values CurrU1_h, CurrV1_h, CurrW1_h, CurrU2_h, CurrV2_h, CurrW2_h.

The controller 62 includes a d-axis sum controller 621, a d-axis difference controller 622, a q-axis sum controller 623, and a q-axis difference controller 624. The d-axis sum controller 621 calculates a d-axis voltage sum command value Vd+* by PI calculation or the like on the basis of the d-axis current sum command value Id+* and the d-axis current sum Id1+Id2. The d-axis difference controller 622 calculates a d-axis voltage difference command value Vd−* by PI calculation or the like on the basis of the d-axis current difference command value Id−* and the d-axis current difference Id−Id2. The q-axis sum controller 623 calculates a q-axis voltage sum command value Vq+* by PI calculation or the like on the basis of the q-axis current sum command value Iq+* and the q-axis current sum Iq1+Iq2. The q-axis difference controller 624 calculates a q-axis voltage difference command value Vq−* by PI calculation or the like on the basis of the q-axis current difference command value Iq−* and the q-axis current difference Iq1−Iq2. In the present embodiment, the current difference command values Id−*, Iq−* are 0.

The system conversion unit 63 converts the voltage sum command values Vd+*, Vq+* and the voltage difference command values Vd−*, Vq−* to the first pre-limitation d-axis voltage command value Vd1*_a, the first pre-limitation q-axis voltage command value Vq1*_a, the second pre-limitation d-axis voltage command value Vd2*_a, and the second pre-limitation q-axis voltage command value Vq2*_a. Further, the voltage control process, the excess correction process, and the like, which are performed on the basis of the first pre-limitation d-axis voltage command value Vd1*_a, the first pre-limitation q-axis voltage command value Vq1*_a, the second pre-limitation d-axis voltage command value Vd2*_a, and the second pre-limitation q-axis voltage command value Vq2*_a, are similar to those of the above embodiments. While either the excess correction process of the first embodiment or that of the second embodiment may be used, a description is given herein assuming that the excess correction process of the second embodiment is performed.

The excess determination unit 65 determines whether the excess correction process is performed. When at least one of the excess amounts Du1_h20, Dv1_h20, Dw1_h20, Du2_h20, Dv2_h20, Dw2_h20 is not 0, it is determined that the excess correction process is being performed. Further, when all of the excess amounts Du1_h20, Dv1_h20, Dw1_h20, Du2_h20, Dv2_h20, Dw2_h20 are 0, it is determined that the excess correction is not being performed.

Whether the excess correction process is performed may be determined on the basis of the phase conversion amounts Du1_h21, Dv1_h21, Dw1_h21, Du2_h21, Dv2_h21, Dw2_h21 or the correction amounts Du1_h22, Dv1_h22, Dw1_h22, Du2_h22, Dv2_h22, Dw2_h22 in place of the excess amounts Du1_h20, Dv1_h20, Dw1_h20, Du2_h20, Dv2_h20, Dw2_h20. In the case of the excess correction process of the first embodiment, the determination can be performed in a similar manner as above.

The excess determination unit 65 may determine that the excess correction is being performed when voltages applied to the winding sets 81, 82 are larger than a voltage determination threshold. The "voltages applied to the winding sets 81, 82" may be voltage command values in the respective calculation processes of the voltage command values Vd1*_a, Vq1*_a, Vd2*_a, Vq2*_a, and the like before limitation by the voltage limitation unit 53, or may be actual voltages that are actually applied to the winding sets 81, 82. Further, the excess determination unit 65 determines that the excess correction is being performed when a rotating speed of the motor 80 is larger than a rotating speed determination threshold. The determination result is outputted to the d-axis difference controller 622 and the q-axis difference controller 624. When determining that the excess correction is being performed, the difference controllers 622, 624 lower the control responsiveness. It is to be noted that switching off the control of the difference controllers 622, 624 is also included in the concept of "lowering the responsiveness."

The first voltage command values Vu1*, Vv1*, Vw1* and the second voltage conversion values Vu2*, Vv2*, Vw2* are calculated using the sum controllers 621, 623 for controlling a sum of currents flowing in the first winding set 81 and the second winding set 82, and the difference controllers 622, 624 for controlling a difference between current flowing in the first winding set 81 and current flowing in the second winding set 82. When the excess correction process is performed, the difference controllers 622, 624 make the responsiveness lower than when the excess correction process is not performed.

In the present embodiment, a command voltage is calculated by controlling the sum and difference, thereby enabling reduction in influences of a temperature change, a variation between elements, and the like. Further, when the excess correction is being performed, the difference control responsiveness is suppressed to avoid a poor condition of the difference control at the time of excess correction, thereby enabling appropriate reduction in torque ripple. Further, similar effects to those of the above embodiments are exerted.

Other Embodiments (I) First Voltage Command Corresponding Value, Second Voltage Command Corresponding Value In the embodiments, the first neutral-point voltage change value corresponds to the first voltage command corresponding value, and the second neutral-point voltage change value corresponds to the second voltage command corresponding value. In another embodiment, each of the first voltage command corresponding value and the second voltage command corresponding value is not restricted to the neutral-point voltage change value, but may be a voltage command value itself. That is, the excess correction process may be performed using a voltage command value before duty conversion. Further, each of the first voltage command corresponding value and the second voltage command corresponding value may be a value other than the neutral-point voltage change value calculated on the basis of a voltage command value such as a duty conversion value. Moreover, the value used for the excess correction process is not restricted to a value in the three-phase coordinate system, but may be a value in another coordinate system.

(II) Current Detection Unit

In the second embodiment, the current detection unit is provided between the low-potential-side switching element and the ground. In another embodiment, the current detection element disposed on the low potential side may be any element capable of current detection, such as a hall element, in place of the shunt resistor. Further, the current detection element may be disposed in any place capable of detecting a phase current, such as the high potential side of the high-potential-side switching element. Moreover, it is desirable to appropriately set the limitation value in accordance with the current detection element as well as the place where the current detection element is disposed.

In the above embodiments, each of the first voltage command value and the second voltage command value is calculated by the current feedback control on the basis of the current detection value. In another embodiment, each of the first voltage command value and the second voltage command value may be calculated not by using the current detection value, but by performing feed-forward control from an electric angle, the number of rotation, or the like, for example. In this case, the current detection unit may be omitted.

(III) Excess Correction Unit

In the above embodiments, the excess correction unit performs the excess correction process on the first neutral-point voltage change value and the second neutral-point voltage change value that are values obtained by changing the neutral-point voltage. In another embodiment, the excess correction unit may perform the excess correction process without changing the neutral-point voltage.

(IV) Voltage Limitation Unit

In the above embodiments, when the pre-limitation voltage vector is larger than the amplitude limitation value, the q-axis component is changed to limit the voltage command value such that the voltage command value becomes the amplitude limitation value. In another embodiment, the voltage command value may be limited so as to be not larger than the amplitude limitation value by any method such as controlling both the d-axis component and the q-axis component, instead of changing the q-axis component.

(V) Electric Rotary Machine

In the above embodiments, the winding sets of the electric rotary machine are disposed with the phases displaced by 30[°]. In another embodiment, the phase difference between the winding sets is not restricted to 30[°], but may be any degrees. Further, the conduction phase difference is not restricted to 30[°], either, and may be any degrees other than 0[°]. The electric rotary machine is used for the electric power steering device. In another embodiment, the electric rotary machine may be applied to an on-board device other than the electric power steering device, or may be applied to an off-board device. Further, the electric rotary machine is not restricted to the motor, but may be a generator, or a so-called motor generator that has combined functions of an electric motor and a generator. In the above, the present disclosure is not restricted to any of the above embodiments, and can be implemented in a variety of forms in a scope not deviating from the gist of the disclosure.

It is noted that a flowchart or the processing of the flowchart in the present application includes sections (also referred to as steps), each of which is represented, for instance, as S101. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A power converter for converting electric power of a three-phase electric rotary machine including a first winding set and a second winding set, the power converter comprising:

a first inverter corresponding to the first winding set;
a second inverter corresponding to the second winding set; and
a control unit including a command calculation unit that calculates a first voltage command value related to a voltage to be applied to the first winding set and a second voltage command value related to a voltage to be applied to the second winding set, and an excess correction unit that corrects a first voltage command corresponding value corresponding to the first voltage command value and a second voltage command corresponding value corresponding to the second voltage command value, wherein:
when one of the first voltage command corresponding value and the second voltage command corresponding value exceeds a limitation value, which is set in accordance with a voltage capable of being outputted, the excess correction unit performs an excess correction process, the first winding set and the second winding set have a phase difference of 30 degrees, in the excess correction process, the excess correction unit calculates an excess amount, which is an amount of the one of the first voltage command corresponding value and the second voltage command corresponding value that exceeds the limitation value, the excess correction unit adds an excess amount corresponding value to the other of the first voltage command corresponding value and the second voltage command corresponding value, and compensates the excess amount with the other of the first voltage command corresponding value and the second voltage command corresponding value, the excess correction unit performs the excess correction process on the first voltage command corresponding value and the second voltage command corresponding value, of which a neutral-point voltage is changed, each of the first inverter and the second inverter includes a high-potential-side switching element and a low-potential-side switching element, which provide a pair corresponding to each phase, the excess correction unit compares an all-phase-on period, in which the low-potential-side switching element of each phase turns on, with a two-phase-on period, in which the low-potential-side switching element of each of two phases turns on; and the excess correction unit changes the neutral-point voltage in order to detect current for one of the all-phase-on period and the two-phase-on period, which is longer than the other of the all-phase-on period and the two-phase-on period.

2. The power converter according to claim 1, further comprising:

a current detection unit that detects a current passing through each phase of the first winding set and the second winding set, wherein:

the command calculation unit calculates the first voltage command value and the second voltage command value based on a current detection value detected by the current detection unit.

3. The power converter according to claim 2, wherein:

the current detection unit is disposed between the low-potential-side switching element and a ground.

4. The power converter according to claim 2, wherein:

the control unit further includes:

a current correction value calculation unit that calculates a current correction value in accordance with a current generated by the excess correction process; and a current correction unit that corrects the current detection value based on the current correction value.

5. The power converter according to claim 1, wherein:

the first voltage command value and the second voltage command value are calculated using a sum controller and a difference controller;

the sum controller controls a sum of a current flowing in the first winding set and a current flowing in the second winding set;

the difference controller controls a difference between the current flowing in the first winding set and the current flowing in the second winding set; and when the excess correction unit performs the excess correction process, the difference controller sets responsiveness lower than when the excess correction unit does not perform the excess correction process.

6. The power converter according to claim 1, wherein:

the first voltage command value and the second voltage command value are limited by a predetermined amplitude limitation value so as to be corrected in accordance with the excess amount.

7. The power converter according to claim 1, wherein:

the electric rotary machine is used for an electric power steering device; and the electric rotary machine assists a steering operation of a steering member by a driver according to an output torque.

* * * * *

UNITED STATES PATENT AND TRADEMARK OFFICE
CERTIFICATE OF CORRECTION

PATENT NO. : 10,239,553 B2
APPLICATION NO. : 15/210743
DATED : March 26, 2019
INVENTOR(S) : Takashi Suzuki Page 1 of 1

It is certified that error appears in the above-identified patent and that said Letters Patent is hereby corrected as shown below:

In the Specification

In Column 12, Line 19, change "(a tan)." to --(atan).--.

In Column 13, Line 4, change "Du2_ca11," to --Du2_ca12,--.

In Column 13, Line 65, change "Du2_ca11," to --Du2_ca12,--.

In Column 20, Line 27, change "Du1_h21," to --Dv1_h21,--.

In Column 20, Line 50 (Approx.), change "Du1_h21" to --Dw1_h21--.

In Column 20, Line 58 (Approx.), change "Du1_h21" to --Dw1_h21--.

In Column 23, Line 45, change "Id-Id2," to --Id1-Id2,--.

In Column 23, Line 46, change "Iq-Iq2." to --Iq1-Iq2.--.

In Column 23, Line 63, change "Id-Id2." to --Id1-Id2.--.

In the Claims

In Column 27, Line 31 (Approx.), Claim 1, change "on;" to --on,--.

Signed and Sealed this
Twenty-fifth Day of June, 2019

Andrei Iancu
*Director of the United States Patent and Trademark Office*